United States Patent
Griot et al.

(10) Patent No.: US 11,722,855 B2
(45) Date of Patent: Aug. 8, 2023

(54) HANDLING OF MULTICAST SERVICE DATA TRANSPORT FOR MOBILITY BETWEEN SUPPORTING AND NON-SUPPORTING ACCESS NODES

(71) Applicant: QUALCOMM incorporated, San Diego, CA (US)

(72) Inventors: Miguel Griot, La Jolla, CA (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 17/307,535

(22) Filed: May 4, 2021

(65) Prior Publication Data

US 2021/0352444 A1   Nov. 11, 2021

Related U.S. Application Data

(60) Provisional application No. 63/020,222, filed on May 5, 2020.

(51) Int. Cl.
*H04W 4/06* (2009.01)
*H04W 76/12* (2018.01)
(Continued)

(52) U.S. Cl.
CPC ............... *H04W 4/06* (2013.01); *H04W 8/02* (2013.01); *H04W 28/0268* (2013.01);
(Continued)

(58) Field of Classification Search
CPC ..... H04W 4/06; H04W 8/02; H04W 28/0268; H04W 36/0011; H04W 36/08;
(Continued)

(56) References Cited

U.S. PATENT DOCUMENTS

2019/0349803 A1* 11/2019 Byun ................... H04W 28/16
2019/0357093 A1* 11/2019 Xu .................... H04W 36/0058
(Continued)

FOREIGN PATENT DOCUMENTS

WO    WO-2021135650 A1 *  7/2021   ........ H04W 36/0007

OTHER PUBLICATIONS

Rico-Alvariño, Alberto, et al. "3GPP Rel-17 Extensions for 5G Media Delivery." IEEE Transactions on Broadcasting (2022) (Year: 2022).*

(Continued)

*Primary Examiner* — Sharad Rampuria
(74) *Attorney, Agent, or Firm* — The Marbury Law Group QUALCOMM Incorporated

(57) ABSTRACT

Embodiments include systems and methods for enabling multicast service data transport for mobility between multicast/broadcast service (MBS) supporting and non-MBS supporting access nodes. Various aspects include methods for supporting an MBS session. In some embodiments, an MBS session context may indicate at least one multicast flow identifier (ID) for an MBS session and a unicast Quality of Service (QoS) flow ID for a unicast Packet Data Unit (PDU) session, wherein the MBS session context associates the unicast QoS flow ID with the at least one multicast flow ID.

18 Claims, 20 Drawing Sheets

(51) Int. Cl.
*H04W 36/08* (2009.01)
*H04W 8/02* (2009.01)
*H04W 36/00* (2009.01)
*H04W 28/02* (2009.01)

(52) U.S. Cl.
CPC ........ *H04W 36/0011* (2013.01); *H04W 36/08* (2013.01); *H04W 76/12* (2018.02)

(58) Field of Classification Search
CPC ............. H04W 76/12; H04W 28/0252; H04W 36/0007; H04W 40/36; H04W 76/11; H04W 76/40; H04J 2203/0019; H04L 12/18; H04L 12/184; H04L 12/1845; H04L 12/185; H04L 47/15; H04L 47/806; H04L 49/201; H04L 49/203; H04L 61/5069; H04L 65/611; H04L 67/1044; H04L 2012/6416; H04L 2012/5642; H04L 67/55; H04Q 2213/242; H04Q 2011/0047; H04N 21/6405; H04N 21/64
See application file for complete search history.

(56) References Cited

U.S. PATENT DOCUMENTS

2021/0068004 A1\* 3/2021 Kadiri ............... H04W 28/0263
2021/0105196 A1\* 4/2021 Dao ...................... H04L 43/026
2022/0086698 A1\* 3/2022 Yao ......................... H04L 43/20
2022/0338088 A1\* 10/2022 Zong ................ H04W 36/0072

OTHER PUBLICATIONS

Rico-Alvariño, Alberto, et al. "3GPP Rel-17 Extensions for 5G Media Delivery." IEEE Transactions on Broadcasting 68.2 (2022): 422-438. (Year: 2022).\*

\* cited by examiner

HANDLING OF MULTICAST SERVICE DATA TRANSPORT FOR MOBILITY BETWEEN SUPPORTING AND NON-SUPPORTING ACCESS NODES

RELATED APPLICATIONS

This application claims the benefit of priority to U.S. Provisional Application No. 63/020,222, entitled "Handling of Multicast Service Data Transport For Mobility Between Supporting And Non-Supporting Access Nodes" filed May 5, 2020, the entire contents of which are hereby incorporated herein by reference for all purposes.

BACKGROUND

Long Term Evolution (LTE), Fifth Generation (5G) new radio (NR)(5GNR), and other recently developed communication technologies allow user equipment to communicate information at data rates (e.g., in terms of Gigabits per second, etc.) that are orders of magnitude greater than what was available just a few years ago.

The different available communication technologies, such as LTE, 5GNR, etc., are enabling many different network implementations and offering different types of networks, sometimes in the same geographic areas, such as the same countries. One implementation option for 5GNR networks being adopted is a 5G standalone (SA) network in which a 5G radio access network (RAN) and 5G core network provide 5G services in a geographic area, such as a country. 5G SA networks can exclusively include NR base stations, such as Next Generation NodeB (gNodeBs or gNBs). Another implementation option for 5GNR networks being adopted is a 5G non-standalone (NSA) network in which a RAN providing both LTE and NR support (e.g., a RAN including both LTE base stations (also referred to as Evolved Universal Terrestrial Radio Access Network (E-UTRAN) base stations), such as LTE Evolved nodeBs (eNodeBs or eNBs), and NR base stations, such as Next Generation NodeB (gNodeBs or gNBs)) is connected to an LTE core network (e.g., an Evolved Packet Core (EPC) network).

SUMMARY

Various aspects include systems and methods for enabling multicast service data transport for mobility between multicast/broadcast service (MBS) supporting and non-MBS supporting access nodes. Various aspects include systems and methods for enabling multicast service data transport for mobility between fifth generation (5G) or later generations MBS supporting and non-MBS supporting access nodes. Various aspects may include methods performed by a processor of a wireless device for supporting an MBS session. Various aspects may include receiving an MBS session context from a source base station of a radio access network (RAN), the MBS session context indicating identifier (ID) for an MBS session and at least one unicast Quality of Service (QoS) flow ID for a unicast Packet Data Unit (PDU) session, wherein the MBS session context associates the at least one unicast QoS flow ID with the at least one multicast flow ID, and establishing radio resources using the MBS session context. In some aspects, the source base station of the RAN may be a source base station of a 5G RAN.

In some aspects, establishing radio resources using the MBS session context may include establishing one or more radio resources of the wireless device according to the MBS session context to receive packets of a service in the MBS session from the source base station of the RAN, receiving a radio resource control (RRC) reconfiguration message from the source base station of the RAN indicating at least one data radio bearer (DRB) and the at least one unicast QoS flow ID for use with a target base station of the RAN, and establishing one or more radio resources of the wireless device according to the at least one DRB and the at least one unicast QoS flow ID to receive packets of the service in a PDU session from the target base station of the RAN.

In some aspects, establishing radio resources using the MBS session context may include establishing one or more radio resources of the wireless device according to the MBS session context to receive packets of a service in the MBS session from the source base station of the RAN, receiving a handover command message from the source base station of the RAN including PDU session context indicating the at least one unicast QoS flow ID for use with a base station not supporting the MBS session, establishing one or more radio resources of the wireless device according to the PDU session context and the at least one unicast QoS flow ID to receive packets of the service in a PDU session from the base station not supporting the MBS session, and moving the MBS session to dormant on the wireless device in response to establishing the one or more radio resources of the wireless device according to the PDU session context and the at least one unicast QoS flow ID. In some aspects, the base station not supporting the MBS session may be a base station of an Evolved Universal Terrestrial Radio Access Network (E-UTRAN).

In some aspects, receiving the MBS session context from the source base station of the RAN may occur after a PDU session for the at least one unicast QoS flow ID has already been established by one or more radio resources of the wireless device to receive packets of a service, and various aspects may further include establishing one or more radio resources of the wireless device according to the MBS session context to receive packets of the service in the MBS session from the source base station of the RAN.

Various aspects may include methods performed by a processor of a base station of a RAN for supporting an MBS session. Such aspects may include receiving an MBS session context from a computing device of a core network, the MBS session context indicating at least one multicast flow ID for an MBS session and at least one unicast QoS flow ID for a unicast PDU session, wherein the MBS session context associates the at least one unicast QoS flow ID with the at least one multicast flow ID, and sending the MBS session context to a wireless device camped on the base station of the RAN.

Some aspects may further include sending a handover request message to a target base station of the RAN in response to determining that a mobility event associated with the wireless device camped on the base station of the RAN is occurring, the handover request message indicating at least one DRB and the at least one unicast QoS flow ID and bearer and session information for the MBS session.

Some aspects may further include determining whether a handover request acknowledgment message received from the target base station of the RAN includes an indication of support for the MBS session, and sending a RRC reconfiguration message to the wireless device camped on the base station of the RAN indicating the at least one DRB and the at least one unicast QoS flow ID for use with the target base station in response to determining that the handover request acknowledgment message from the target base station does not include an indication of support for the MBS session.

Some aspects may further include receiving a multicast/broadcast (MB) end marker from the computing device of the core network, sending the MB end marker to the target base station of the RAN, and stopping forwarding of data from the MBS session to the target base station of the RAN in response to sending the MB end marker to the target base station of the RAN.

Some aspects may further include sending a handover request message to a target base station of an E-UTRAN in response to determining that a mobility event associated with the wireless device camped on the base station of the RAN is occurring, the handover request message indicating at least one DRB and the at least one unicast QoS flow ID.

In some aspects, sending the MBS session context to the wireless device camped on the base station of the RAN occurs after a PDU session for the at least one unicast QoS flow ID has already been established with the wireless device camped on the base station of the RAN. In some aspects, the computing device of the computing device of the core network may be a User Plane Function (UPF) computing device of a 5G (or later generation) core network.

Various aspects may include methods performed by a processor of a computing device of a core network for supporting an MBS session. Such aspects may include generating a MBS session context for a service in which packets are to be provided via both MBS and unicast, the MBS session context indicating at least one multicast flow ID for an MBS session and at least one unicast QoS flow ID for a unicast PDU session, wherein the MBS session context associates the at least one unicast QoS flow ID with the at least one multicast flow ID, and sending the MBS session context to another computing device of the core network configured to provide packets of the service to base stations of radio access networks via both MBS and unicast.

Some aspects may further include determining that the MBS session needs to be moved to a unicast PDU session for a wireless device receiving the service in the MBS session, and sending a session modification request to the other computing device of the core network indicating that the wireless device receiving the service in the MBS session needs to be moved from a multicast/broadcast (MB) shared tunnel endpoint ID (TEID) to a unicast TEID. In some aspects, the computing device of the core network may be a Session Management Function (SMF) computing device of a 5G (or later generation) core network and the other computing device of the core network may be a UPF computing device of the 5G core network.

Some aspects may further include receiving a MBS session context for a service in which packets are to be provided via both MBS and unicast from another computing device of a core network, the MBS session context indicating at least one multicast flow ID for an MBS session and at least one unicast QoS flow ID for a unicast PDU session, wherein the MBS session context associates the at least one unicast QoS flow ID with the at least one multicast flow ID, and sending the MBS session context to a base station of a RAN configured to support MBS.

Some aspects may further include receiving a session modification request from the other computing device of the core network indicating that a wireless device receiving the service in the MBS session needs to be moved from a MB shared TEID to a unicast TEID, and moving the wireless device receiving the service in the MBS session from the MB shared TEID to the unicast TEID.

Some aspects may further include inserting a MB end marker into a last packet of the service for the wireless device to be carried in the MBS session in response to moving the wireless device receiving the service in the MBS session from the MB shared TETD to the unicast TEID, sending the last packet of the service for the wireless device in the MBS session to the base station of the RAN, and sending packets of the service to the wireless device via the unicast TEID in response to sending the last packet of the service for the wireless device in the MBS session to the base station of the RAN. In some aspects, the computing device of the core network may be a UPF computing device of a 5G (or later generation) core network and the other computing device of the core network may be a SMF computing device of the 5G core network.

Further aspects may include a wireless device having a processor configured to perform one or more operations of any of the methods summarized above. Further aspects may include a non-transitory processor-readable storage medium having stored thereon processor-executable instructions configured to cause a processor of a wireless device to perform operations of any of the methods summarized above. Further aspects include a wireless device having means for performing functions of any of the methods summarized above. Further aspects include a system-on-chip for use in a wireless device that includes a processor configured to perform one or more operations of any of the methods summarized above. Further aspects include a system in a package that includes two systems on chip for use in a wireless device that includes a processor configured to perform one or more operations of any of the methods summarized above.

Further aspects may include a base station of a RAN having a processor configured to perform one or more operations of any of the methods summarized above. Further aspects may include a non-transitory processor-readable storage medium having stored thereon processor-executable instructions configured to cause a processor of a base station of a RAN to perform operations of any of the methods summarized above. Further aspects include a base station of a RAN having means for performing functions of any of the methods summarized above. Further aspects include a system-on-chip for use in a base station of a RAN that includes a processor configured to perform one or more operations of any of the methods summarized above. Further aspects include a system in a package that includes two systems on chip for use in a base station of a RAN that includes a processor configured to perform one or more operations of any of the methods summarized above.

Further aspects may include a computing device of a core network having a processor configured to perform one or more operations of any of the methods summarized above. Further aspects may include a non-transitory processor-readable storage medium having stored thereon processor-executable instructions configured to cause a processor of a computing device of a core network to perform operations of any of the methods summarized above. Further aspects include a computing device of a core network having means for performing functions of any of the methods summarized above. Further aspects include a system-on-chip for use in a computing device of a core network that includes a processor configured to perform one or more operations of any of the methods summarized above. Further aspects include a system in a package that includes two systems on chip for use in a computing device of a core network that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
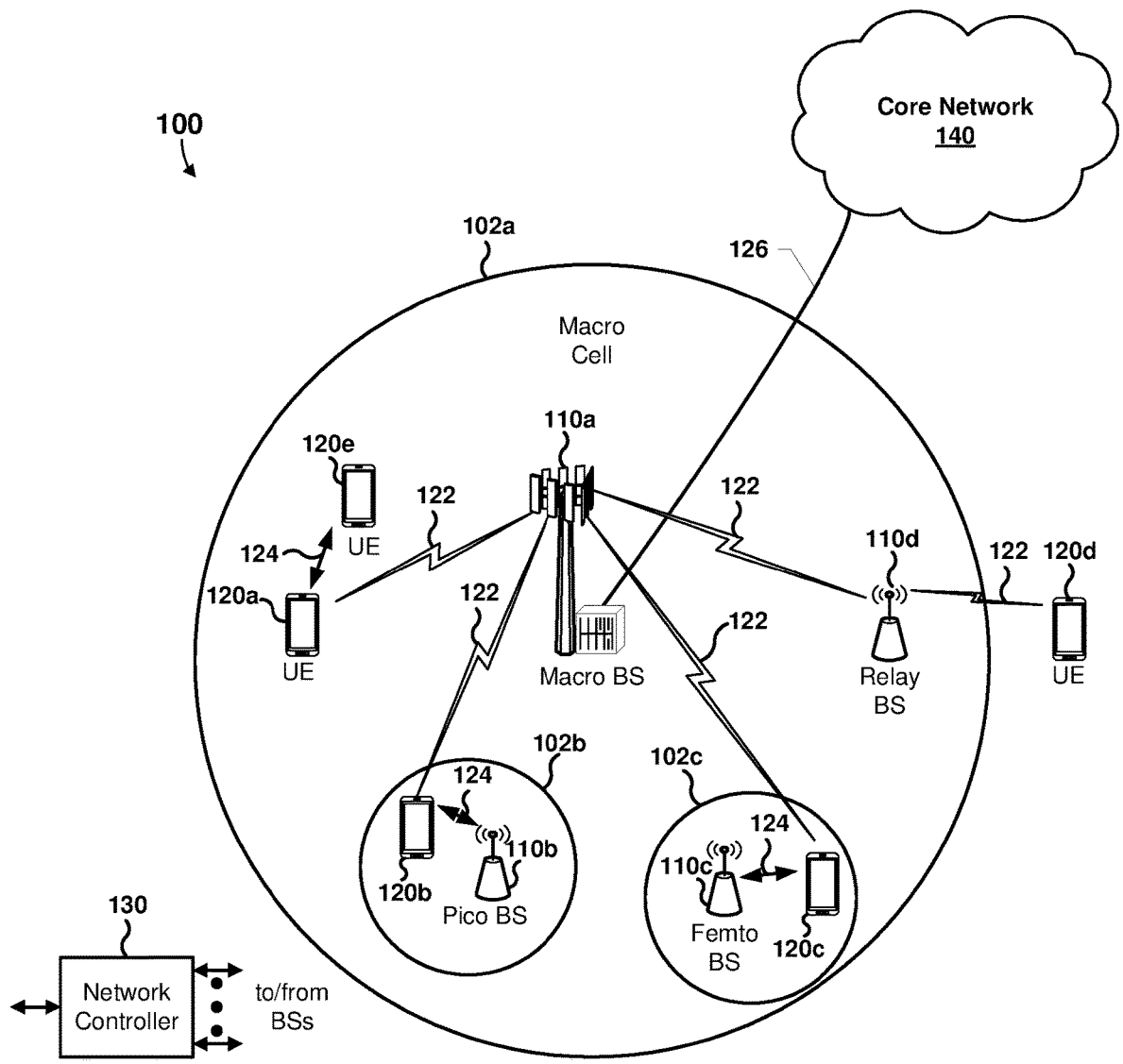
FIG. 1A is a system block diagram illustrating an example communication system suitable for implementing any of the various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include systems and methods for enabling multicast service data transport for mobility between multicast/broadcast service (MBS) supporting and non-MBS supporting access nodes. Various embodiments include systems and methods for enabling multicast service data transport for mobility between fifth generation (5G) or later generation MBS supporting and non-MBS supporting access nodes. Various embodiments include methods for supporting an MBS session. In some embodiments, an MBS session context may indicate at least one multicast flow identifier (ID) for an MBS session and at least one unicast Quality of Service (QoS) flow ID for a unicast Packet Data Unit (PDU) session, wherein the MBS session context associates the at least one unicast QoS flow ID with the at least one multicast flow ID. Various embodiments may improve a user experience by enabling an MBS service to continue to be received during mobility events between (MBS) supporting and non-MBS supporting base stations.

The term "wireless device" is used herein to refer to any one or all of cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, wireless router devices, wireless appliances, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, one or more radio resources, and a programmable processor.

The term "radio resource" is used herein to refer to hardware, such as modems, radios, processors, transceivers, transmitters, receivers, timers, voltage regulators, oscillators, amplifiers, filters, antennas, circuits, encoders, decoders, etc., and/or software that operate individually, or in any combination, for sending and/or receiving electromagnetic radiation to provide wireless communication services, such as cellular and mobile communication services.

The term "system-on-chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

As used herein, the terms "network," "system," "wireless network," "cellular network," and "wireless communication network" may interchangeably refer to a portion or all of a wireless network of a carrier associated with a wireless device and/or subscription on a wireless device. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), IEEE 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards.

LTE is a mobile network standard for 4G wireless communication of high-speed data developed by the 3GPP (3rd Generation Partnership Project) and specified in its Release 8 document series. In contrast to the circuit-switched (CS) model of cellular network standards, LTE has been designed to support only packet switched (PS) services. Data services in LTE may be provided over the Internet, while multimedia services may be supported by the Internet Multimedia Subsystem (IMS) framework. The LTE standard is based on the evolution of the Universal Mobile Telecommunications System (UMTS) radio access through the Evolved Universal Terrestrial Radio Access Network (E-UTRAN). The E-UTRAN together with the Evolved Packet Core (EPC) network (core network accommodating LTE) make up an Evolved Packet System (EPS). While the access network in UMTS emulates a circuit-switched connection for real time services and a packet-switched connection for datacom services, the Evolved Packet System (EPS) is purely Internet Protocol (IP) based, and both real time services and datacom services are carried by the IP protocol.

The 5G system is an advanced technology from 4G LTE, and provides a new radio access technology (RAT) through the evolution of the existing mobile communication network structure. A 5G system may support, for example, extended LTE (eLTE) as well as non-3GPP access (e.g., WLAN).

One implementation option for advanced networks, such as 5G new radio (NR)(5GNR) networks, future generation system networks (e.g., sixth generation (6G) or higher networks), etc., being adopted is a 5G SA network in which a 5G radio access network (RAN) and 5G core network provide 5G services in geographic area, such as a country. As such, 5G SA networks can overlap coverage in the geographic area, such as the country, with LTE networks. 5G SA networks can exclusively include NR base stations, such as Next Generation NodeB (gNodeBs or gNBs).

Another implementation option for advanced systems or networks (e.g., 5G systems or networks, 6G systems or networks, higher generation systems or networks, etc.) currently being adopted is a 5G NSA network in which a RAN providing both LTE (also referred to as 4G) and new radio (NR) (also referred to a 5G) support (e.g., a RAN including both LTE base stations, such as LTE Evolved nodeBs (eNodeBs or eNBs), and NR base stations, such as Next Generation NodeB (gNodeBs or gNBs)) is connected to an LTE core network (e.g., an Evolved Packet Core (EPC) network). A wireless device, sometimes referred to as a user equipment (UE), in such 5G NSA networks that can support both LTE and NR communications can signal to the 5G NSA that the UE supports dual connectivity with new radio (DCNR).

In 5G NSA networks, different data traffic may exist for different services. For example, conventional IP-oriented (i.e., "data-centric") applications (e.g., web-browsers, games, e-mail applications, etc.), may be provided in an LTE and/or 5G system as data services over the public Internet. Real-time communication services (e.g., voice calls, Short Message Service (SMS) communications, etc.) may be provided in an LTE and/or 5G system as IMS services. The IMS architecture allows operators to offer carrier grade services to be offered on packet-switched networks. Examples of services that have been standardized on top of IMS include Open Mobile Alliance (OMA) presence and group list management, Push-to-Talk over Cellular (PoC), Instant Messaging, and TISPAN/3GPP multimedia telephony for IMS (MMTel). Other IMS services that have been developed for deployment as next-generation LTE services include Voice over LTE (VoLTE) and Video Telephony (VT). Thus, although LTE and 5G data is IP-based, the multiple data types/services may be accessed through different packet data networks (PDNs) in the 5G NSA network.

Advanced networks, such as 5GNR networks, 6G networks, or higher networks, etc., are making new services available to wireless devices (sometimes also referred to as user equipments (UEs)). One such 5G service may be 5G multicast/broadcast service (MBS). 5G MBS may offer improvements over EPC Multimedia Broadcast/Multicast Service (MBMS), such as better integration between unicast and multicast transport delivery. In 5G MBS, services may have both unicast and multicast/broadcast components. At a radio level, 5G MBS may enable a base station to dynamically select between unicast and multicast delivery of a service. The selection between unicast and multicast delivery may be made based on various factors, such as capacity, number of devices, volume, radio condition considerations, etc. 5G MBS may provide a more dynamic and efficient switching mechanism between unicast and multicast/broadcast delivery than EPC MBMS.

5G MBS may support a separation of service and transport layers. 5G MBS may include a standalone transport layer allowing applications to use 5G MBS transport directly. 5G MBS may also provide a 3GPP defined service layer (e.g., an LTE service layer) for those services that do require a service layer.

Regardless of the implementation of a network (e.g., a 5G SA network, a 5G NSA network, etc.), not all base stations (also referred to as access nodes) in the network may be configured to support the same services, such as the same 5G services. As a specific example, some base stations (or access nodes) may support 5G multicast/broadcast (MB) while other base stations (or access nodes) may not support 5G MB. Additionally, base stations of non-5G RANs, such as base stations of an E-UTRAN, may not support 5G services, such as 5G MB. The existence of different types of base stations and different service support capabilities presents mobility challenges for wireless devices moving between supporting and non-supporting base stations (support and non-support access nodes), and vice versa.

FIG. 1A is a system block diagram illustrating an example communication system 100 suitable for implementing any of the various embodiments. The communication system 100 may be a 5GNR network, such as a 5G SA, 5G NSA, etc., or any other suitable network such as an LTE network, etc. The example communication system 100 may be suitable for implementing 5G MBS. While FIG. 1A illustrates a 5GNR network, later generation networks may include the same or similar elements. Therefore, the reference to a 5GNR network and 5GNR network elements in the following descriptions is for illustrative purposes and is not intended to be limiting.

The communication system 100 may include a heterogeneous network architecture that includes a core network 140 and a variety of mobile devices (illustrated as user equipment (UE) 120a-120e in FIG. 1). The communication system 100 may also include a number of base stations (illustrated as the BS 110a, the BS 110b, the BS 110c, and the BS 110d) and other network entities. A base station is an entity that communicates with wireless devices, and also may be referred to as a Node B, an LTE Evolved nodeB (eNodeB or eNB), an access point (AP), a Radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station Subsystem serving this coverage area, or a combination thereof, depending on the context in which the term is used. The core network 140 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1A, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communication system 100 through various types of backhaul interfaces, such as a direct physical connection, a virtual network, or a combination thereof using any suitable transport network The base station 110a-110d may communicate with the core network 140 over a wired or wireless communication link 126. The wireless device (e.g., user equipment (UE)) 120a-120e may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communication system 100 also may include relay stations (e.g., relay BS 110d). A relay station is an entity that can receive a transmission of data from an upstream station (for example, a base station or a mobile device) and transmit the data to a downstream station (for example, a wireless device (e.g., UE) or a base station). A relay station also may be a mobile device that can relay transmissions for other wireless devices. In the example illustrated in FIG. 1A, a relay station 110d may communicate with macro the base station 110a and the wireless device 120d in order to facilitate communication between the base station 110a and the wireless device 120*d*. A relay station also may be referred to as a relay base station, a relay base station, a relay, etc.

The communication system 100 may be a heterogeneous network that includes base stations of different types, for example, macro base stations, pico base stations, femto base stations, relay base stations, etc. These different types of base stations may have different transmit power levels, different coverage areas, and different impacts on interference in communication system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (e.g., UEs) 120*a*, 120*b*, 120*c* may be dispersed throughout communication system 100, and each wireless device may be stationary or mobile. A wireless device also may be referred to as an access terminal, a terminal, a mobile station, a subscriber unit, a station, user equipment (UE), etc.

A macro base station 110*a* may communicate with the core network 140 over a wired or wireless communication link 126. The wireless devices 120*a*, 120*b*, 120*c* may communicate with a base station 110*a*-110*d* over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, CDMA, WCDMA, Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum Resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 Resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a New Radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR Resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device. Multi-layer transmissions with up to 2 streams per wireless device may be supported. Aggregation of multiple cells may be supported with up to eight serving cells. Alternatively, NR may support a different air interface, other than an OFDM-based air interface.

Some mobile devices may be considered machine-type communication (MTC) or Evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. A wireless device (e.g., UE) 120*a-e* may be included inside a housing that houses components of the wireless device, such as processor components, memory components, similar components, or a combination thereof.

In general, any number of communication systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G NSA network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an EPC network) in a 5G NSA network. As another example, a 5G SA network may utilize a 5G/NR RAT in a 5G/NR RAN connected to a 5G core network.

In some embodiments, two or more wireless devices 120a-e (for example, illustrated as the wireless device 120a and the wireless device 120e) may communicate directly using one or more sidelink channels 124 (for example, without using a base station 110a-110d as an intermediary to communicate with one another). For example, wireless device 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a.

Figure 1B:
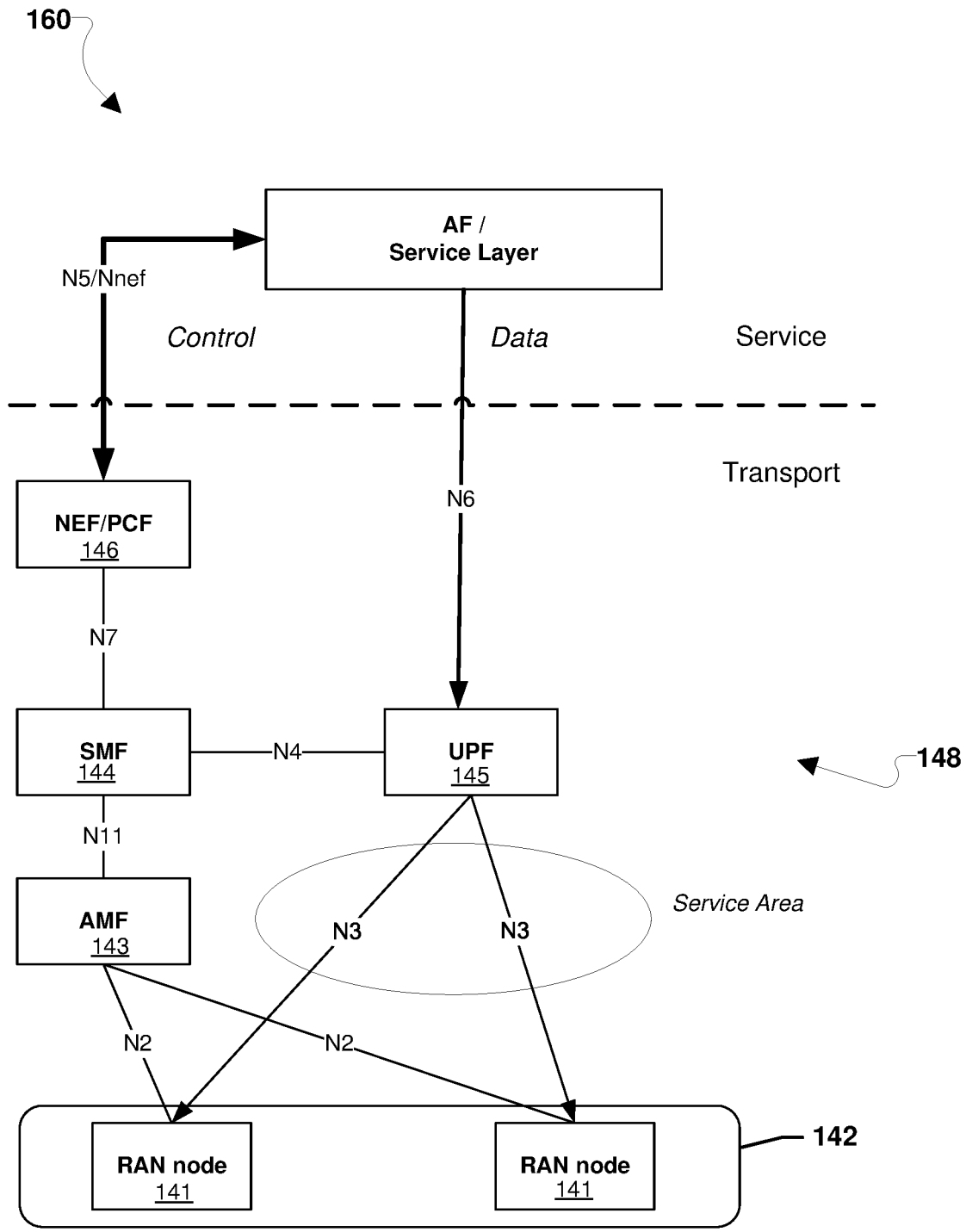
FIG. 1B is a system block diagram illustrating an example network architecture of a fifth Generation (5G) new radio (NR)(5GNR) network suitable for implementing any of the various embodiments.

FIG. 1B is a system block diagram illustrating an example network architecture of a 5GNR network 160. With reference to FIGS. 1A-1B, the 5GNR network 160 may be an example implementation of the system 100. While FIG. 1B illustrates a 5GNR network 160, later generation networks may include the same or similar elements. Therefore, the reference to the 5GNR network 160 and the various elements of the 5GNR network 160 in the following descriptions is for illustrative purposes and is not intended to be limiting. The 5GNR network 160 may include a 5G core network 148, such as core network 140, connected to a 5G RAN 142. The 5G RAN 142 may include RAN nodes 141 (e.g., base stations 110a-110d). The 5G core network 148 may include an application function (AF) layer and a service layer, as well as a transport layer. The transport layer may include various computing devices (also referred to as network computing devices), such as a Session Management Function (SMF) computing device 144 (also referred to as a SMF 144), a User Plane Function (UPF) computing device 145 (also referred to as a UPF 145), an Access and Mobility Function (AMF) computing device 143 (also referred to as a AMF 143), and a Network Exposure Function (NEF) and Policy Charging Function (PCF)(NEF/PCF) computing device 146 (also referred to as a NEF/PCF 146). While illustrated as separate devices, the SMF computing device 144, UPF computing device 145, AMF computing device 143, and/or NEF/PCF computing device 146 may alternatively be logical entities on the same and/or separate computing devices, such as separate modules. As a specific example, the SMF computing device 144, UPF computing device 145, AMF computing device 143, and/or NEF/PCF computing device 146 may be servers of the 5G core network 148.

The SMF computing device 144, UPF computing device 145, AMF computing device 143, and/or NEF/PCF computing device 146 may exchange messages (and/or other signaling) with one another via various communication interfaces in the 5G core network 148, such as the N11 interface, N4 interface, N7 interface, N5/Nnef interface, etc. The SMF computing device 144, UPF computing device 145, AMF computing device 143, and/or NEF/PCF computing device 146 may exchange messages (and/or other signaling) with the 5G RAN 142 and/or devices of the 5G RAN 142, such as RAN nodes 141, etc., via various communication interfaces. For example, the AMF computing device 143 may exchange messages (and/or other signaling) with RAN nodes 141 via the N2 interface and the UPF computing device 145 may exchange messages (and/or other signaling) with RAN nodes 141 via the N3 interface.

Figure 1C:
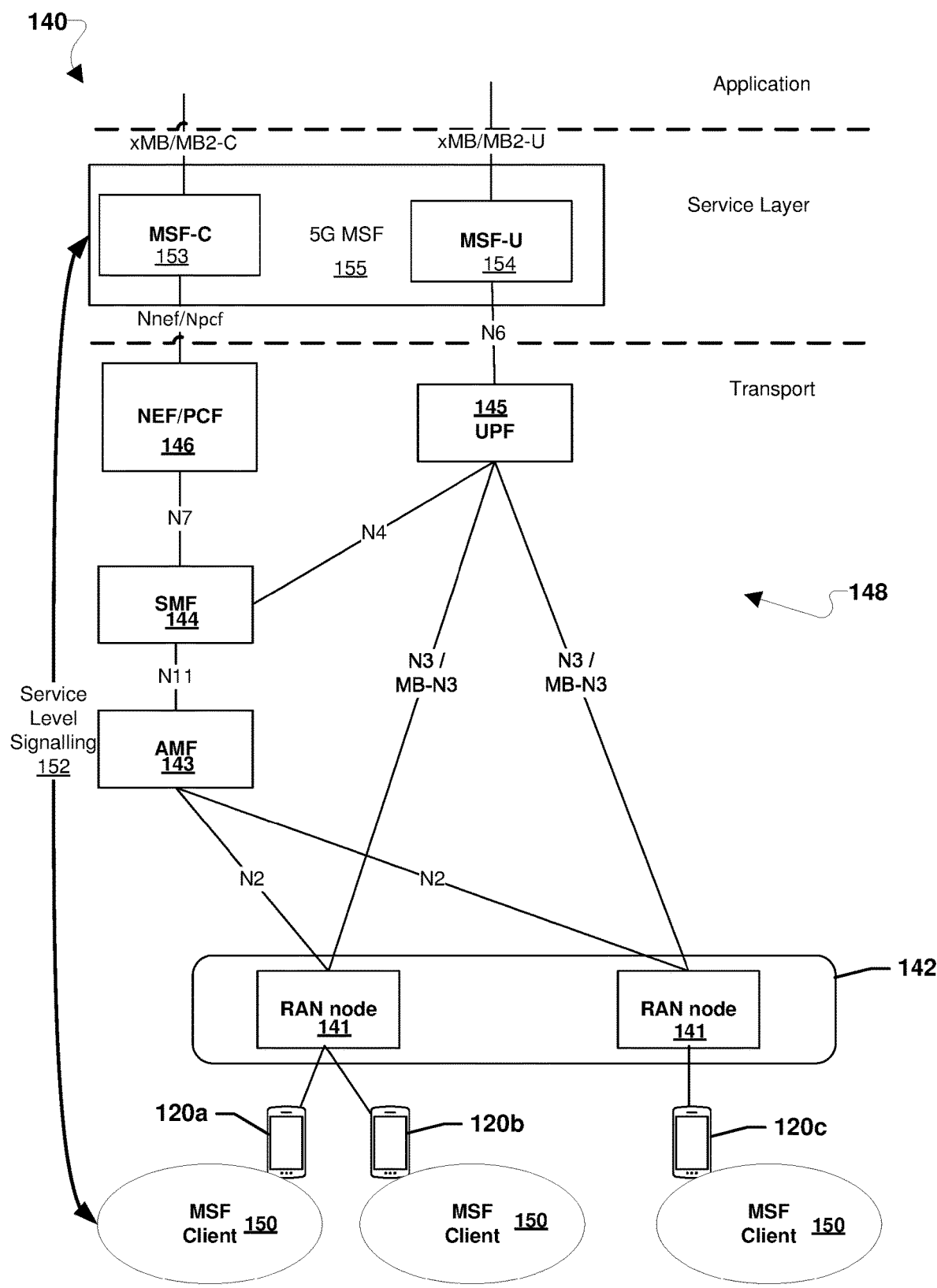
FIG. 1C is a system block diagram illustrating an example network architecture of a 5GNR network suitable for implementing any of the various embodiments.

FIG. 1C is a system block diagram illustrating additional aspects of the service layer of the 5GNR network 160. With reference to FIGS. 1A-1C, the service layer of the 5G core network 148 may include a Multicast Service Function (MSF) computing device 155 (also referred to as an MSF 155) including an MSF control plane (MSF-C) entity (or module) 153 and an MSF user plane (MSF-U) entity (or module) 154. While illustrated as separate devices and/or entities, the MSF computing device 155, MSF-C entity 153, and/or MSF-U entity 154 may alternatively be logical entities on the same and/or separate computing devices, such as separate modules. The MSF computing device 155, MSF-C entity 153, and/or MSF-U entity 154 may exchange messages (and/or other signaling) with one another, and/or with other computing devices (e.g., the NEF/PCF computing device 146, the UPF computing device 145, etc.), via various communication interfaces in the 5G core network 148. As examples, the MSF-C entity 153 may exchange messages (and/or other signaling) with the NEF/PCF computing device 146 via the Nnef/Npcf interface, the MSF-U entity 154 may exchange messages (and/or other signaling) with the UPF computing device 145 via the N6 interface, the MSF-C entity 153 may exchange messages (and/or other signaling) with computing devices of the application function (AF) layer via the xMB/MB2-C interface, and the MSF-U entity 154 may exchange messages (and/or other signaling) with computing devices of the AF layer via the xMB/MB2-U interface.

In the 5GNR network 160, wireless devices, such as wireless devices 120a, 120b, and 120c, may camp on the RAN nodes 141. The wireless devices, such as wireless devices 120a, 120b, and 120c, may include MSF clients 150 running on processors of the wireless devices. The MSF clients 150 running on the processors of the wireless devices may support the wireless devices, such as wireless devices 120a, 120b, and 120c, receiving packets of a service via 5G MBS sessions. The MSF clients 150 and MSF computing device 155 may exchange service level signaling 152 with one another. As an example, the service level signaling 152 may be out-of-band signaling.

The NEF/PCF computing device 146 may be configured to provide 5G MBS service exposure. The NEF/PCF computing device 146 may be configured to enable the negotiation of 5G MBS service with an AF entity, such as to assign a QoS for a service, 5G MBS service area for a service, etc. The NEF/PCF computing device 146 may be configured to support policies for multicast services, including QoS parameters, such as 5G QoS Identifier (5QI), maximum bit rate (MBR), guaranteed bit rate (GBR), etc. The NEF/PCF computing device 146 may provide policy information regarding the MBS session to the SMF computing device 144. The NEF/PCF computing device 146 may receive MBS service information from an AF entity, directly (such as when the AF entity is operator owned) or indirectly via NEF.

The SMF computing device 144 may be configured to control MBS transport. The SMF computing device 144 may be configured to configured the UPF 145 for MBS flows and unicast QoS flows. The SMF computing device 144 may be configured to configure the RAN 142 for MBS flows and QoS information. The SMF computing device 144 may be configured to support session management (SM) configuration at the wireless device (e.g., wireless device 120a-e) for MBS flows. The SMF computing device 144 may be used for both unicast and MBS.

The UPF computing device 145 may be configured to support packet filtering of MBS flows. The UPF computing device 145 may be configured to support delivery of MBS flows to the RAN 142 via point-to-point or point-to-multipoint, such as via the N3 interface. The UPF computing device 145 may be configured to receive 5G MBS flow configuration from the SMF 144. The UPF computing device 145 may be configured to detect Internet Group Management Protocol (IGMP) packets and notifications sent to the SMF 144, for example if wireless device (e.g., wireless device 120*a*-*e*) joining is performed via IGMP. The UPF computing device 145 may be configured to receive both unicast and MBS flows. The UPF computing device 145 may be configured to deliver a same flow as MBS flow in a certain area using point-to-multipoint tunnelling and as unicast flow to specific wireless devices (e.g., for legacy non-5G wireless devices).

The 5G RAN 142 and its associated base stations, such as RAN nodes 141 (e.g., base stations 110*a*-110*d*), may be configured to support reception of MBS flows, such as via N3 interfaces, and delivery over-the-air. The 5G RAN 142 and its associated base stations, such as RAN nodes 141 (e.g., base stations 110*a*-110*d*), may be configured to switch between multicast and unicast delivery of MBS flows. The 5G RAN 142 and its associated base stations, such as RAN nodes 141 (e.g., base stations 110*a*-110*d*), may be configured to configure wireless devices (e.g., wireless devices 120*a*-*e*) for MBS flow reception at access stratum (AS) layer(s).

The wireless devices (e.g., wireless devices 120*a*-*e*) may be configured to support extensions of session management (SM) contexts for MBS flows. The wireless devices (e.g., wireless devices 120*a*-*e*) may be configured to support signaling for joining MBS flow (e.g., via SM signalling, user plane IGMP Join, etc.). The wireless devices (e.g., wireless devices 120*a*-*e*) may be configured to provide MBS support at the AS layer(s).

In the 5GNR network 160, network functions (NFs) and/or interfaces, such as an MSF computing device 155, MSF-C entity 153, MSF-U entity 154, xMB-C/MB2-C, and/or xMB-U/MB2-U, may provide a service layer for 5G MBS. The MSF-C entity 153 may be configured to control multicast service configuration. The MSF-C entity 153 may be configured to provide service ID management (e.g., Temporary Mobile Group Identifier (TMGI) management/assignment, etc.). The MSF-C entity 153 may be configured to handle service authorization. The MSF-C entity 153 may be configured to be the point of xMB-C/MB2-C interface termination. The MSF-C entity 153 may be configured to handle encoding/decoding (CODEC) configuration as needed. The MSF-U entity 154 may be configured to be the point of xMB-U/MB2-U interface termination. The MSF-U entity 154 may be configured to handle encoding of data at the service layer. The MSF-U entity 154 may be configured to provide for multicast service layer data packets delivery via the N6 interface.

Figure 2:
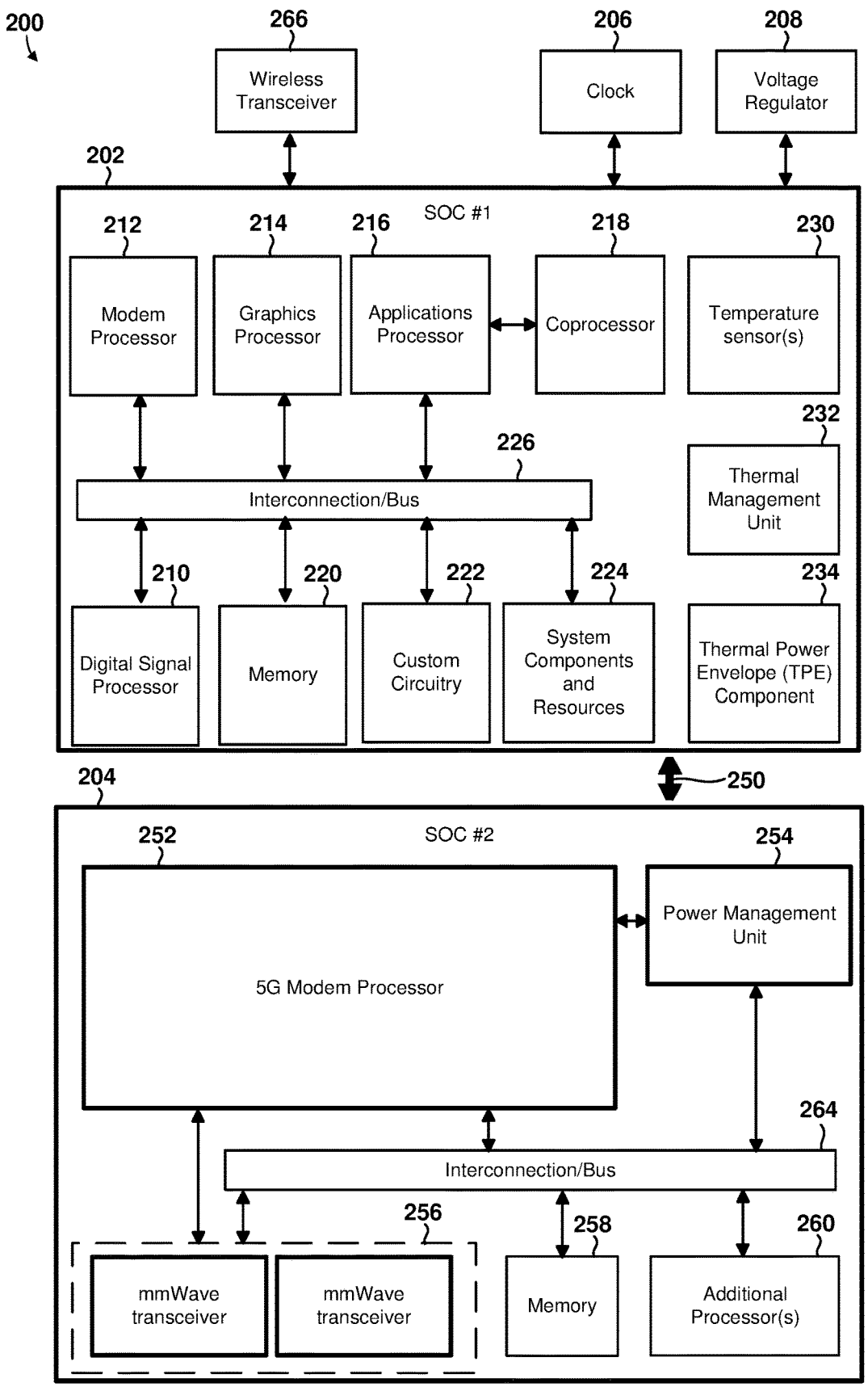
FIG. 2 is a component block diagram illustrating an example computing and wireless modem system suitable for implementing any of the various embodiments.

FIG. 2 is a component block diagram illustrating an example computing and wireless modem system 200 suitable for implementing any of the various embodiments. Various embodiments may be implemented on a number of single processor and multiprocessor computer systems, including a system-on-chip (SOC) or system in a package (SIP).

With reference to FIGS. 1A-2, the illustrated example wireless device 200 (which may be a SIP in some embodiments) includes a two SOCs 202, 204 coupled to a clock 206, a voltage regulator 208, and a wireless transceiver 266 configured to send and receive wireless communications via an antenna (not shown) to/from network wireless devices, such as a base station 110*a*. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G (or later generation) processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor (AP) 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, the plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
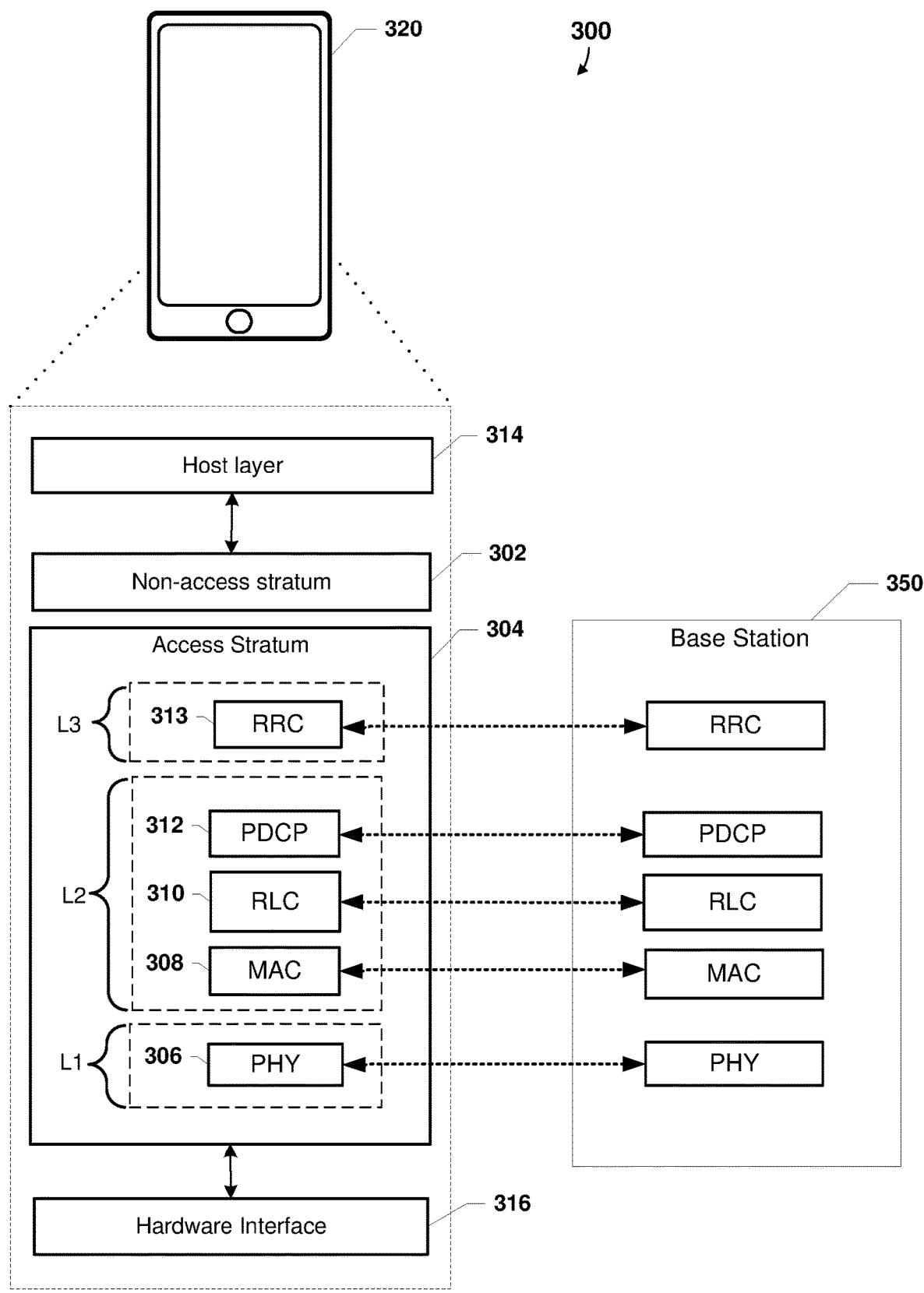
FIG. 3 is a component block diagram illustrating a software architecture including a radio protocol stack for the user and control planes in wireless communications suitable for implementing any of the various embodiments.

FIG. 3 is a component block diagram illustrating a software architecture 300 including a radio protocol stack for the user and control planes in wireless communications suitable for implementing any of the various embodiments. With reference to FIGS. 1A-3, the wireless device 320 may implement the software architecture 300 to facilitate communication between a wireless device 320 (e.g., the wireless device 120a-120e, 200) and the base station 350 (e.g., the base station 110a) of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support Packet filtering, security management, mobility control, session management, and traffic and signaling between a SIM(s) of the wireless device and its core network 140. The AS 304 may include functions and protocols that support communication between a SIM(s) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various embodiments, Layer 2 may include a Media Access Control (MAC) sublayer 308, a Radio link Control (RLC) sublayer 310, and a Packet data convergence protocol (PDCP) 312 sublayer, each of which form logical connections terminating at the base station 350.

In the control plane, Layer 3 (L3) of the AS 304 may include a Radio Resource Control (RRC) sublayer 3. While not shown, the software architecture 300 may include additional Layer 3 sublayers, as well as various upper layers above Layer 3. In various embodiments, the RRC sublayer 313 may provide functions including broadcasting system information, paging, and establishing and releasing an RRC signaling connection between the wireless device 320 and the base station 350.

In various embodiments, the PDCP sublayer 312 may provide uplink functions including multiplexing between different Radio bearers and logical channels, sequence number addition, handover data handling, integrity protection, ciphering, and header compression. In the downlink, the PDCP sublayer 312 may provide functions that include in-sequence delivery of data packets, duplicate data Packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4A:
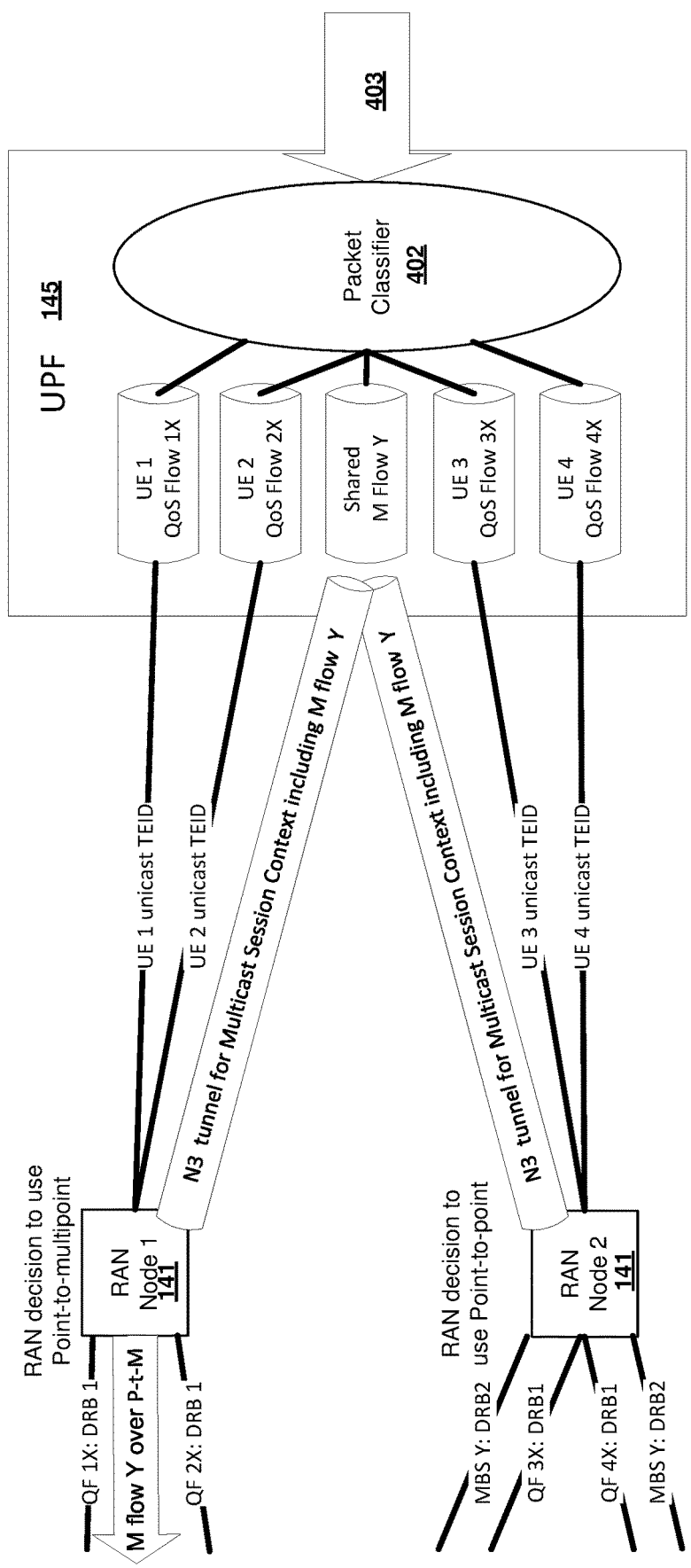
FIG. 4A is a block diagram of a portion of a 5GNR network illustrating a multicast/broadcast service (MBS) transport model and packet filtering suitable for implementing any of the various embodiments.

FIG. 4A is a block diagram of a portion of the 5GNR network 160, such as UPF 145 of a 5G core network 148 (e.g., core network 140) and RAN nodes 141 (e.g., base stations 110a-d) of 5G RAN network 142 illustrating an MBS transport model and packet filtering. With reference to FIGS. 1A-4A, packets of a service 403 may be received from a content provider computing device (e.g., a media server, content server, etc.) by a packet classifier 402 of the UPF 145. The packet classifier 402 may assign the packets to flows for provisioning the service to wireless devices (e.g., wireless devices 120a-e) camped on various ones of the RAN nodes 141 (e.g., base stations 110a-d).

The UPF 145 may concurrently deliver a same packet (e.g., a MB service data packet) via a MB shared tunnel endpoint ID (TEID) and via unicast TEID for some wireless devices (e.g., wireless devices 120*a-e*). Wireless devices (e.g., wireless devices 120*a-e*) that receive the MB service data via unicast TEID and unicast Quality of Service (QoS) flow may be wireless devices (e.g., wireless devices 120*a-e*) camped on RAN nodes 141 (e.g., base stations 110*a-d*) that may not support use of a MB shared TEID, such as RAN nodes 141 (e.g., base stations 110*a-d*) that may not support the MB-N3 interface, and/or wireless devices (e.g., wireless devices 120*a-e*) that may not support MB transport. Delivery of separate copies of MBS data packets to individual wireless devices (e.g., wireless devices 120*a-e*) via the unicast TEID may be referred to as a 5G Core (5GC) Individual MBS traffic delivery method. Wireless devices (e.g., wireless devices 120*a-e*) that receive MB service data packets via MB shared TEID and MB flow may be wireless devices (e.g., wireless devices 120*a-e*) that support MB transport and are camped on RAN nodes 141 (e.g., base stations 110*a-d*) that support MB shared TEIDs. Delivery of a single copy of MBS data packets via the MB shared TEID may be referred to as 5GC shared MBS traffic delivery.

A RAN node 141 (e.g., base station 110*a-d*) that supports MB transport may be configured to determine whether or not to use point-to-multipoint delivery for camped wireless devices (e.g., wireless devices 120*a-e*). For example, FIG. 4A illustrates that while two RAN nodes 141 (e.g., base station 110*a-d*) may both have an established N3 tunnel for a multicast session context including an MBS flow (labeled M flow Y in FIG. 4A), one RAN node 141 may select point-to-multipoint delivery (e.g., a 5GC shared MBS traffic delivery method) while the other RAN node 141 may select to use point-to-point delivery (e.g., a 5GC Individual MBS traffic delivery method).

FIG. 4A further illustrates that the same packets of the service 403 may be transported via unicast delivery to certain wireless devices (labeled UE1, UE2, UE3, UE4 in FIG. 4A) in their own respective QoS flows (labeled QoS Flow 1X, 2X, 3X, 4X in FIG. 4A) while other wireless devices in multicast groups may receive the same packets of the service 403 transported via MBS in the shared MBS flow (labeled M flow Y in FIG. 4A). Packets of the service 403 transported via unicast may have their own data radio bearers (DRB) for their respective QoS flows from the RAN nodes 141 (labeled QF 1X:DRB 1, QF 2X:DRB 1, QF 3X:DRB 1, and QF 4X:DRB1 in FIG. 4A) while the packets of the service 403 transported via MBS may be provided in multicast flows (e.g., labeled M flow Y over P-t-M in FIG. 4A) from a RAN node 141 using point-to-multipoint transmission or in point-to-point transmissions having their own DRBs (labeled MBS Y:DRB2 in FIG. 4A) from a RAN node 141 selecting not to use point-to-multipoint transmission.

Figure 4B:
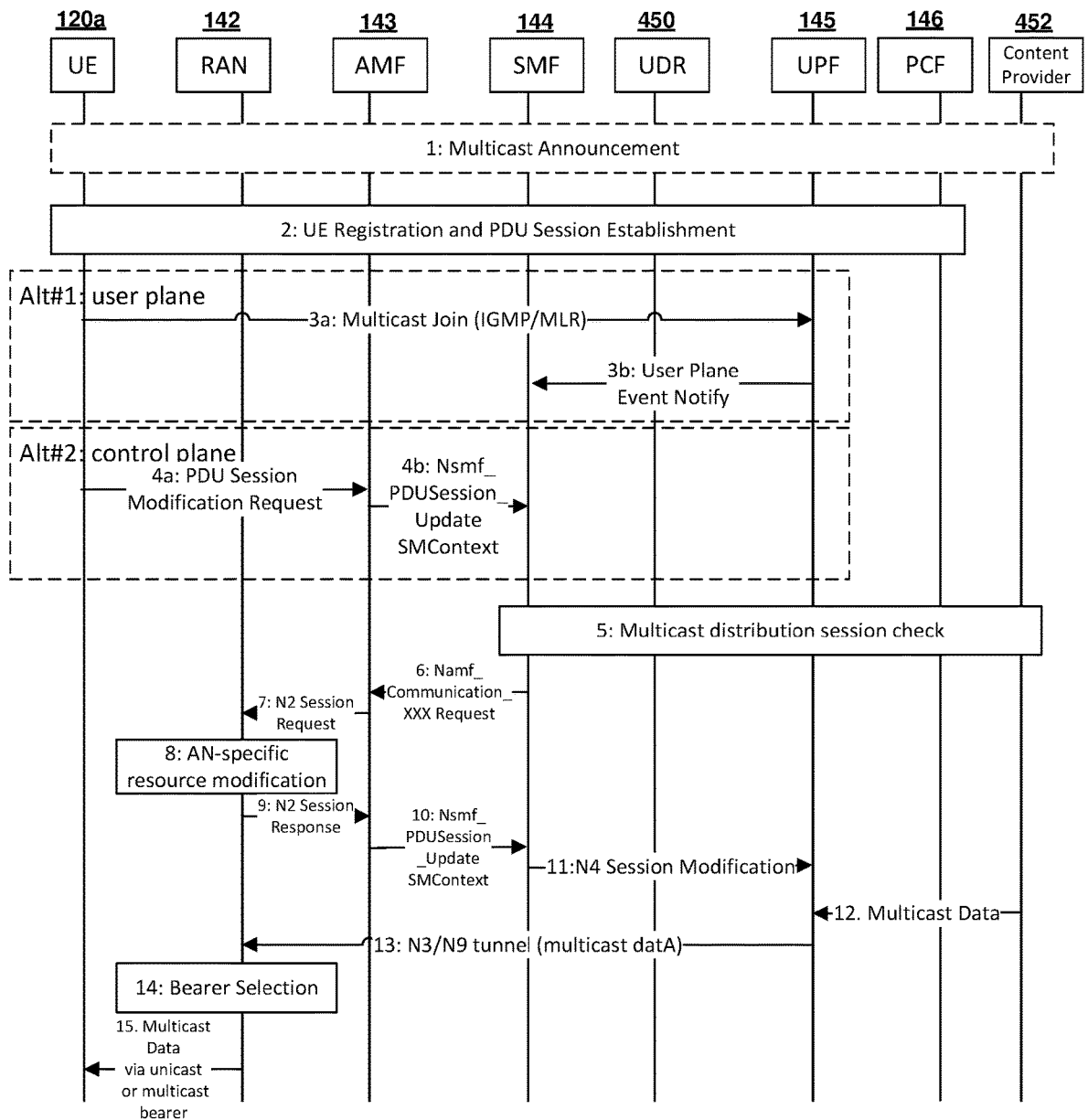
FIG. 4B is a call flow diagram illustrating example interactions between devices in a 5GNR network for enabling MBS context establishment.

FIG. 4B is a call flow diagram illustrating example interactions between devices in a 5GNR network 160 for enabling MBS context establishment With reference to FIGS. 1A-4B, example interactions between a wireless device 120*a*, 5G RAN 142, AMF 143, SMF 144, User Data Repository (UDR) computing device 450 (also referred to as UDR 450), UPF 145, NEF/PCF 146, and a content provider computing device 452 (also referred to as a content provider 452), such as a media server, content servicer, etc., to establish a session for delivery of multicast data via unicast or a multicast bearer either by user plane, or alternative control plane, operations are illustrated in FIG. 4B. In one example (labeled Alt #1 in FIG. 4B), the user plane is used to trigger the MBS content establishment by IGMP signaling. When the user plane is used to trigger MBS content establishment, the UPF 145 may detect the IGMP signaling and send a UPF event notify to the SMF 144 indicating to the SMF 144 to configure an MBS context. In another example, (labeled Alt #2 in FIG. 4B), the control plane is used to trigger the MBS context establishment by SM signaling from the wireless device 120*a-e*. When the control plane is used to trigger MBS content establishment the wireless device 120*a-e* initiated packet data unit (PDU) session establishment/modification may be signaled from the AMF 143 to the SMF 144 thereby indicating to the SMF 144 to configure an MBS context.

Various embodiments may enable mobility of a wireless device (e.g., wireless device 120*a-e*) between supporting and non-supporting RAN nodes (e.g., RAN node 141, base station 110*a-d*) for 5G MBS. Some embodiments may provide methods for supporting a 5G MBS session. Some embodiments may associate unicast PDU sessions with MBS sessions. Some embodiments may include generating, providing, and using multicast session contexts indicating at least one multicast flow ID for an MBS session and an associated unicast QoS flow ID for the at least one multicast flow ID in a 5GNR network (e.g., 5GNR network 160). Some embodiments may include generating, providing, and using MBS session contexts indicating at least one multicast flow ID for an MBS session and at least one unicast QoS flow ID for a unicast PDU session in which the MBS session context associates the at least one unicast QoS flow ID with the at least one multicast flow ID. Some embodiments may enable mobility from a 5G system (5GS) to an E-UTRAN/EPC for multicast traffic. Some embodiments may enable using the associated unicast PDU session and converting an MBS session to a packet data network (PDN) connection. Some embodiments may leverage 5G core to EPC interworking. In some embodiments, a wireless device (e.g., wireless device 102*a-e*) may receive MBS via unicast while the wireless device is in E-UTRAN/EPC. Some embodiments may have no impact to service layer/applications. Various embodiments may support mobility to areas with no support of 5G MBS.

Various embodiments may support mobility from an MBS supporting RAN node (e.g., RAN node 141, base station 110*a-d*) to a non-supporting RAN node (e.g., RAN node 141, base station 110*a-d*). Some embodiments may provide a transport layer solution to mobility from an MBS supporting RAN node (e.g., RAN node 141, base station 110*a-d*) to a non-supporting RAN node (e.g., RAN node 141, base station 110*a-d*). Some embodiments may provide a solution to an MBS supporting RAN node (e.g., RAN node 141, base station 110*a-d*) to a non-supporting RAN node (e.g., RAN node 141, base station 110*a-d*) that may be transparent to an application and/or service layer and not impact application/service layer operation. Some embodiments may associate MBS flows and QoS flows so as to remove a need for SM signaling. In some embodiments, a wireless device (e.g., wireless device 120*a-e*) may be notified of an availability of receiving MB service data over a MB flow or unicast QoS flow depending on the configuration of radio resource control (RRC) messages.

Various embodiments may enable a wireless device (e.g., wireless device 120*a-e*) to establish a multicast/broadcast context with an associated unicast context with a network entity, such as an SMF (e.g., 144). Some embodiments may enable a wireless device (e.g., wireless device 120*a-e*) to establish a multicast/broadcast context with pairings of one or more associated MB flows with QoS flows. Some embodiments may enable a wireless device (e.g., wireless device 120*a-e*) to establish radio resources for an MBS context. Some embodiments may enable a wireless device (e.g., wireless device 120*a-e*) to receive, from a RAN (e.g., 5G RAN 142) during a mobility event, indications that the radio resources for the MBS context are being transferred to radio resources for an associated unicast PDU session. Some embodiments may enable a wireless device (e.g., wireless device 120*a-e*) to receive from a target node data from the radio bearers associated with the unicast PDU session. Some embodiments may support a wireless device (e.g., wireless device 120*a-e*) returning from being camped on a non-MBS supporting RAN node (e.g., base station 110*a-d*, RAN node 141) to an MBS supporting RAN node (e.g., base station 110*a-d*, RAN node 141).

Various embodiments may enable a base station (e.g., base station 110*a-d*, RAN node 141) to receive from a core network (e.g., core network 140, 148) information of an associated PDU session and QoS flows for an MBS context and MBS flows. Some embodiments may enable a base station (e.g., base station 110*a-d*, RAN node 141) to configure a wireless device (e.g., wireless device 120*a-e*) at radio level (e.g., using Radio Resource Control (RRC) messages) with radio bearers (multicast radio bearers (MRBs) or data radio bearers (DRBs)) to transmit MBS data for the MBS context. Some embodiments may enable a base station (e.g., base station 110*a-d*, RAN node 141) to determine, at a mobility event, that target RAN node does not support MBS and move the MBS context to unicast radio resources for the associated PDU session QoS flows, deactivating the radio resource for the MBS context. In some embodiments, the determination as to not supporting MBS may be due to inter-system mobility (e.g., 5G to 4G, etc.), or due to lack of support indication from the target RAN node for intra-system mobility. Some embodiments may enable a base station (e.g., base station 110*a-d*, RAN node 141) to notify a wireless device (e.g., wireless device 120*a-e*), such as via RRC messages, of the deactivation of MBS context and configure radio resources for the associated unicast PDU association. Some embodiments may enable a base station (e.g., base station 110*a-d*, RAN node 141) to provide a target RAN node with the radio resource configuration for the associated unicast PDU session. Some embodiments may enable a base station (e.g., base stations 110*a-d*, RAN node 141) to handle end marker indications in flow on a per wireless device (e.g., wireless device 120*a-e*) basis.

Various embodiments may enable a computing device (e.g., SMF 144) of a 5G core network (e.g., core network 140, 148) to configure a wireless device (e.g., wireless device 120*a-e*) with MBS context and associated PDU session. Some embodiments may enable a computing device (e.g., SMF 144) of a 5G core network (e.g., core network 140, 148) to activate an MBS context at a base station (e.g., base station 110*a-d*, RAN node 141) and/or a UPF (e.g., UPF 145) for MBS downlink data transmission. Some embodiments may enable a computing device (e.g., SMF 144) of a 5G core network (e.g., core network 140, 148) to provide to a base station (e.g., base station 110*a-d*, RAN node 141) the associated unicast PDU session information. Some embodiments may enable a computing device (e.g., SMF 144) of a 5G core network (e.g., core network 140, 148) to detect during a mobility event that the wireless device (e.g., wireless device 120*a-e*) has moved to a non-supporting RAN node (e.g., base station 110*a-d*, RAN node 141) and reconfiguring the UPF (e.g., UPF 145) tunnel information from shared tunnel to a unicast tunnel for that wireless device (e.g., wireless device 120*a-e*).

Various embodiments may enable a computing device (e.g., UPF 145) of a 5G core network (e.g., core network 140, 148) to support changing of a tunnel type from shared to unicast. Some embodiments may enable a computing device (e.g., UPF 145) of a 5G core network (e.g., core network 140, 148) to handle end markers on a per wireless device (e.g., wireless device 120*a-e*) basis. Some embodiments may enable moving a data flow to a preestablished unicast PDU session for wireless devices camping on base stations not supporting MBS. In some embodiments, when an MBS context is established, an associated unicast PDU session may be established at a session management layer as well. In some embodiments, the MBS service data received at a UPF may be tunneled in a unicast tunnel of an associated PDU session when the wireless device is camped on a non-MBS supporting RAN node. In some embodiments, the wireless device may be served via a shared tunnel/radio resources for an MBS context when the wireless device camps on base station supporting MBS. In some embodiments, support for MBS changes may be detected at a RAN level, at an SMF, and/or at a wireless device.

Figure 5:
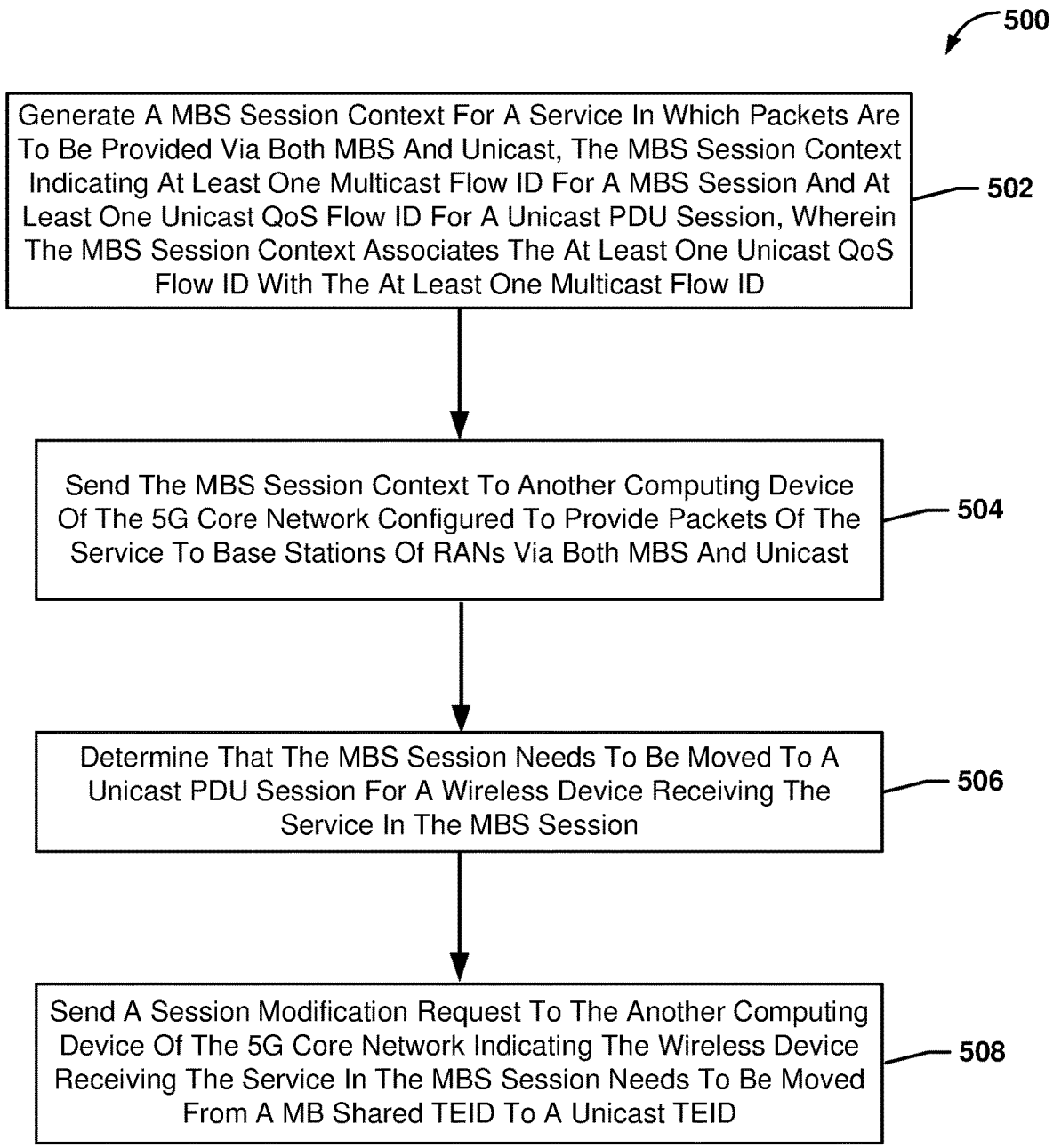
FIG. 5 is a process flow diagram illustrating a method that may be performed by a processor of a computing device of a core network for supporting an MBS session.

FIG. 5 is a process flow diagram illustrating a method 500 that may be performed by a processor of a computing device of core network, such as a 5G core network (or later generation core network), for supporting an MBS session, such as a 5G MBS session. With reference to FIGS. 1A-5, the method 500 may be implemented by one or more processors (e.g., 210, 212, 214, 216, 218, 252, 260, 426) of a SMF computing device (e.g., 144, 200). With reference to FIGS. 1A-5, means for performing each of the operations of the method 500 may be one or more processors of a SMF computing device (e.g., 144, 200), such as one or more of the processors 210, 212, 214, 216, 218, 252, 260, 426, and/or the like.

Figure 6:
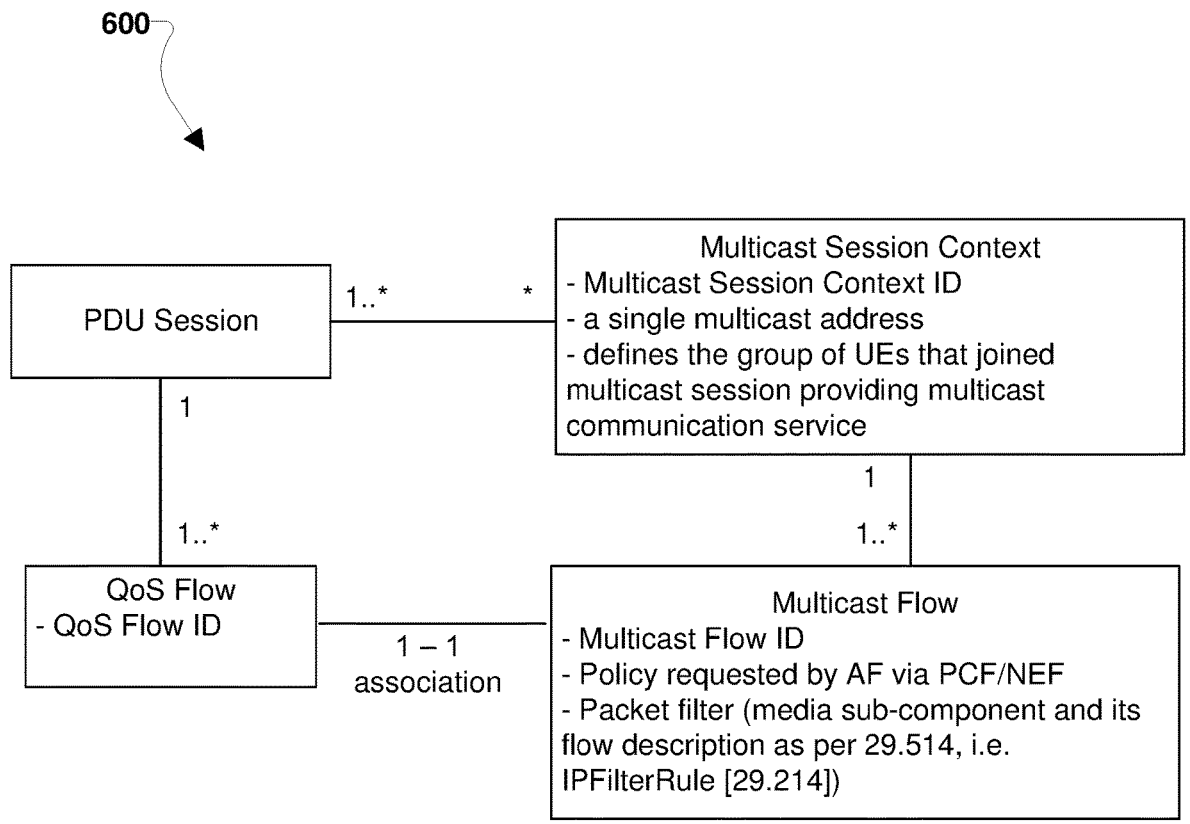
FIG. 6 illustrates an MBS session context for a service in which packets are to be provided via both MBS and unicast according to various embodiments.

In block 502, the processor may generate an MBS session context for a service in which packets are to be provided via both MBS and unicast, the MBS session context indicating at least one multicast flow ID for an MBS session and at least one unicast QoS flow ID for a unicast PDU session, wherein the MBS session context associates the at least one unicast QoS flow ID with the at least one multicast flow ID. The MBS session context may represent a single multicast session (e.g., for IP type, represents a single IP multicast group address). In the MBS session context, there may be one shared tunnel per multicast session. One multicast session may have multiple multicast flows. As one example, the MBS session context may be an MBS session context as illustrated in FIG. 6. The MBS session context may indicate a one-to-one association of QoS flows to multicast flows.

In block 504, the processor may send the MBS session context to another computing device of the 5G core network configured to provide packets of the service to base stations of RANs via both MBS and unicast. For example, the processor may send the MBS session context to a UPF computing device (e.g., UPF 145), such as via the N4 interface.

In block 506, the processor may determine that the MBS session needs to be moved to a unicast PDU session for a wireless device receiving the service in the MBS session. For example, the processor may determine whether a PDU session update request is received from an AMF computing device (e.g., AMF 143), such as on a session management function interface (e.g., Nsmf). The detection of a PDU session update request for a wireless device previously registered for MBS data reception may cause the processor to determine that the MBS session needs to be moved to a unicast PDU session for a wireless device receiving the service in the MBS session. For example, the determination that the MBS session needs to be moved to a unicast PDU session for a wireless device receiving the service in the MBS session may be a determination that the MBS session needs to be moved from a 5GC shared MBS traffic delivery method for a wireless device receiving the service in the MBS session to a 5GC Individual MBS traffic delivery method.

In block 508, the processor may send a session modification request to the other computing device of the 5G core network indicating that the wireless device receiving the service in the MBS session needs to be moved from a MB shared TEID to a unicast TEID. For example, the processor may send a session modification request to a UPF computing device (e.g., UPF 145), such as via the N4 interface. The session modification request may trigger the UPF computing device (e.g., UPF 145) to transition provisioning of packets of a service to a wireless device from multicast transport to unicast transport. For example, the session modification request may trigger the UPF computing device (e.g., UPF 145) to transition provisioning of packets of a service to a wireless device from a 5GC shared MBS traffic delivery method to a 5GC Individual MBS traffic delivery method.

FIG. 6 illustrates an MBS session context 600 for a service in which packets are to be provided via both MBS and unicast according to various embodiments. With reference to FIGS. 1A-6, the MBS session context 600 associates an MBS transport session with a unicast transport session. The MBS session context 600 may include a multicast session context and multicast QoS flows. The MBS session context 600 may be assigned by an SMF (e.g., SMF 144). The SMF (e.g., SMF 144) may configure the wireless device (e.g., wireless device 120*a-e*), such as via SM signaling, the RAN (e.g., 5G RAN 142), such as via signaling on the N2 interface, and/or the UPF (e.g., UPF 145), such as via signaling on the N4 interface. The MBS session context 600 may represent a single multicast session (e.g., for IP type, represents a single IP multicast group address). On the N3 interface there may be one shared tunnel per multicast session. One multicast session may have multiple multicast flows. In some embodiments, each multicast flow may have an associated unicast QoS flow ID in the MBS session context 600. In various embodiments, the SMF (e.g., SMF 144) may configure wireless devices (e.g., wireless devices 120*a-e*) and/or base stations (e.g., base station 110*a-d*, RAN node 141) with the MB flow and QoS flow association, such as via MBS session context 600. In some embodiments, the QoS flow ID may be the MB flow ID. The QoS flow ID being the MB flow ID may require coordination of QoS flow IDs between wireless devices (e.g., wireless devices 120*a-e*) with same MB context. In various embodiments, the MBS session context 600 may indicate at least one multicast flow ID for an MBS session and at least one unicast QoS flow ID for a unicast PDU session, wherein the MBS session context associates the at least one unicast QoS flow ID with the at least one multicast flow ID. The MBS session context 600 may include a unicast PDU session context associated with the multicast session context. The MBS session context 600 may include MBS flows that are associated with unicast QoS flows from the associated unicast session context. In various embodiments, there may be multiple MBS flows for the same MBS session context 600. The multiple MBS flows may be moved to multiple unicast QoS flows from the associated unicast session context. For example, one or more unicast QoS flows may be associated with one or more MBS flows. Additionally, multiple data radio bearers (DRBs) may be associated with unicast QoS flow IDs. For example, one or more DRBs may be indicated for the one or more unicast QoS flows.

Figure 7:
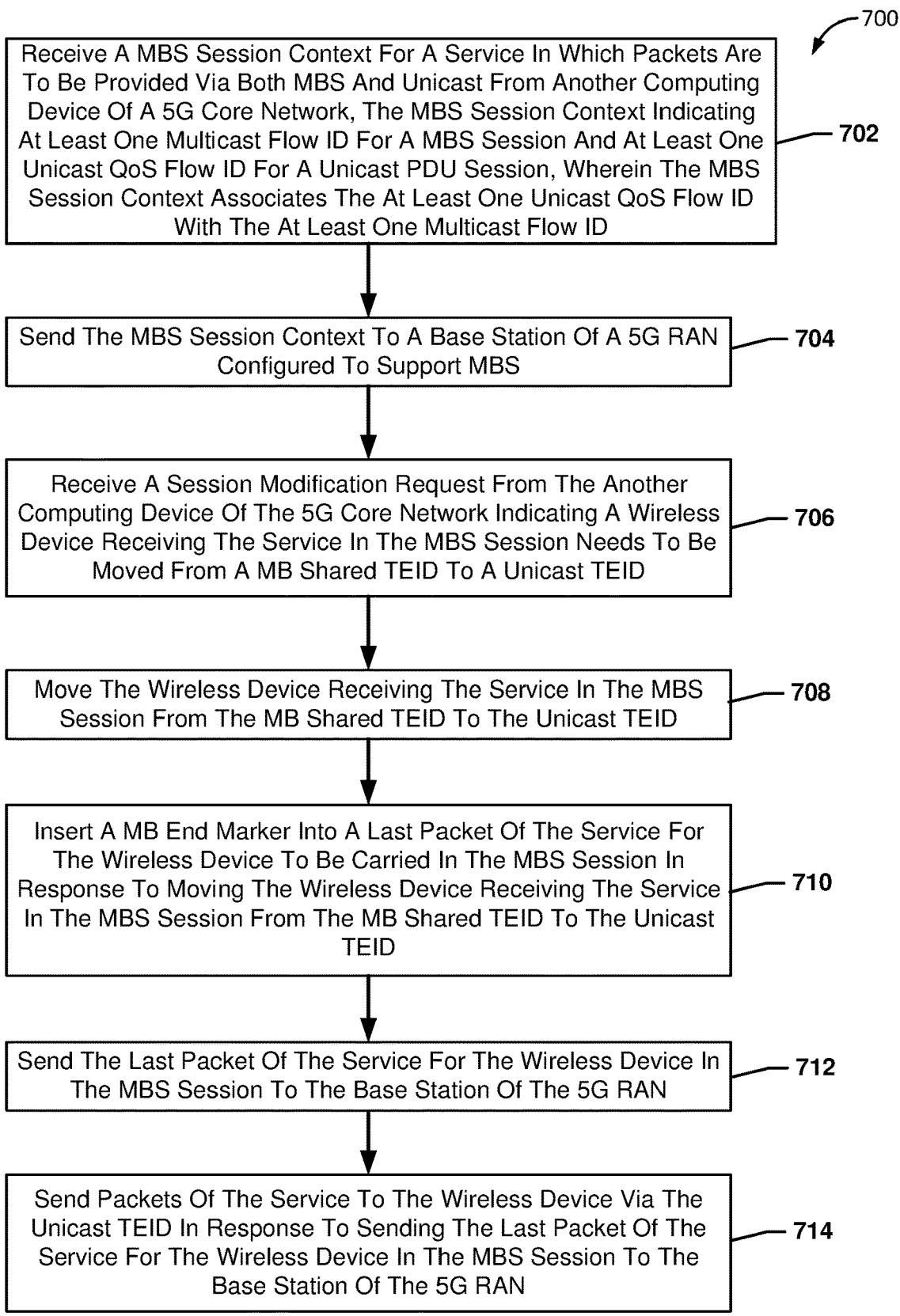
FIG. 7 is a process flow diagram illustrating a method that may be performed by a processor of a computing device of a core network for supporting an MBS session.

FIG. 7 is a process flow diagram illustrating a method 700 that may be performed by a processor of a computing device of a core network, such as a 5G core network (or later generation core network) for supporting an MBS session, such as a 5G MBS session. With reference to FIGS. 1A-7, the method 700 may be implemented by one or more processors (e.g., 210, 212, 214, 216, 218, 252, 260, 426) of a UPF computing device (e.g., 145, 200). With reference to FIGS. 1A-7, means for performing each of the operations of the method 700 may be one or more processors of a UPF computing device (e.g., 145, 200), such as one or more of the processors 210, 212, 214, 216, 218, 252, 260, 426, and/or the like. In some embodiments, the operations of method 700 may be performed in conjunction with the operations of method 500 (FIG. 5).

In block 702, the processor may receive an MBS session context for a service in which packets are to be provided via both MBS and unicast from another computing device of a 5G core network, the MBS session context indicating at least one multicast flow ID for an MBS session and at least one unicast QoS flow ID for a unicast PDU session, wherein the MBS session context associates the at least one unicast QoS flow ID with the at least one multicast flow ID. The MBS session context may represent a single multicast session (e.g., for IP type, represents a single IP multicast group address). In the MBS session context, there may be one shared tunnel per multicast session. One multicast session may have multiple multicast flows. As one example, the MBS session context may be an MBS session context as illustrated in FIG. 6. The MBS session context may indicate a one-to-one association of QoS flows to multicast flows. As an example, the other computing device of the 5G core network may be a SMF computing device (e.g., SMF 144) that generated the MBS session context. The MBS session context may be received from the SMF computing device (e.g., SMF 144) via the N4 interface.

In block 704, the processor may send the MBS session context to a base station of a 5G RAN (e.g., base station 110*a-d*, RAN node 141, 350) configured to support MBS. For example, the processor may send the MBS session context to a gNB on which a wireless device (e.g., wireless device 120*a-e*) is currently camped and registered to receive packets of the MBS service associated with the MBS session context.

In block 706, the processor may receive a session modification request from the other computing device of the 5G core network indicating that a wireless device receiving the service in the MBS session needs to be moved from a MB shared TEID to a unicast TEID. For example, the processor may receive a session modification request from the SMF computing device (e.g., SMF 144) via the N4 interface. The session modification request may trigger the processor to transition provisioning of packets of a service to a wireless device from multicast transport to unicast transport. For example, a session modification request may trigger the processor to transition provisioning of packets of a service to a wireless device from a 5GC shared MBS traffic delivery method to a 5GC Individual MBS traffic delivery method.

In block 708, the processor may move the wireless device receiving the service in the MBS session from the MB shared TEID to the unicast TEID. For example, the processor may remove the wireless device from a multicast group receiving the MBS session via the MB shared TEID and associate the wireless device with its own unicast TEID and the QoS flow for the MBS service in the MBS session context to cause the wireless device to receive the MBS service via unicast delivery.

In block 710, the processor may insert a MB end marker into a last packet of the service for the wireless device to be carried in the MBS session in response to moving the wireless device receiving the service in the MBS session from the MB shared TEID to the unicast TEID. In this manner, the processor may indicate the last packet to be provided via multicast delivery and that the packets after the end marker may be sent via unicast.

In block 712, the processor may send the last packet of the service for the wireless device in the MBS session to the base station of the 5G RAN. The base station of the 5G RAN may forward the last packet to the base station on which the wireless device is now camped and handover of the wireless device may be completed.

In block 714, the processor may send packets of the service to the wireless device via the unicast TEID in response to sending the last packet of the service for the wireless device in the MBS session to the base station of the 5G RAN. In this manner, the wireless device may continue to receive the MBS service via unicast delivery.

Figure 8:
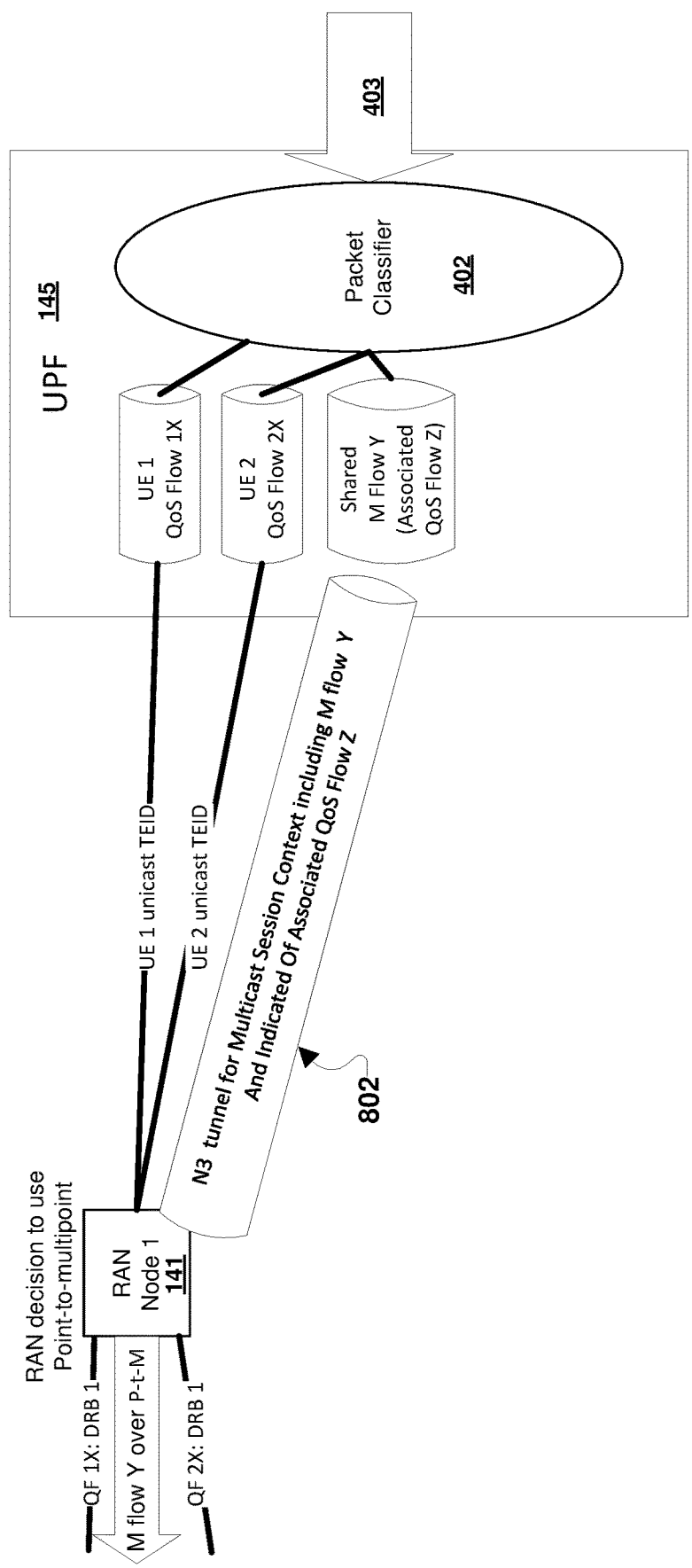
FIG. 8 is a block diagram of a portion of a 5GNR network illustrating an MBS transport model and packet filtering according to various embodiments.

FIG. 8 is a block diagram of a portion of a 5GNR network 160, such as UPF 145 of a 5G core network 148 (e.g., core network 140) and RAN node 141 (e.g., base station 110a-d) of 5G RAN network 142 illustrating an MBS transport model and packet filtering according to various embodiments. With reference to FIGS. 1A-8, the MBS transport model and packet filtering may be similar to that described with reference to FIG. 4A, except that the N3 tunnel 802 may support an MBS session context (e.g., MBS session context 600) including a multicast flow (labeled M flow Y in FIG. 8) and an indication of an associated QoS flow (labeled QoS flow Z in FIG. 8) available for that multicast flow.

Figure 9:
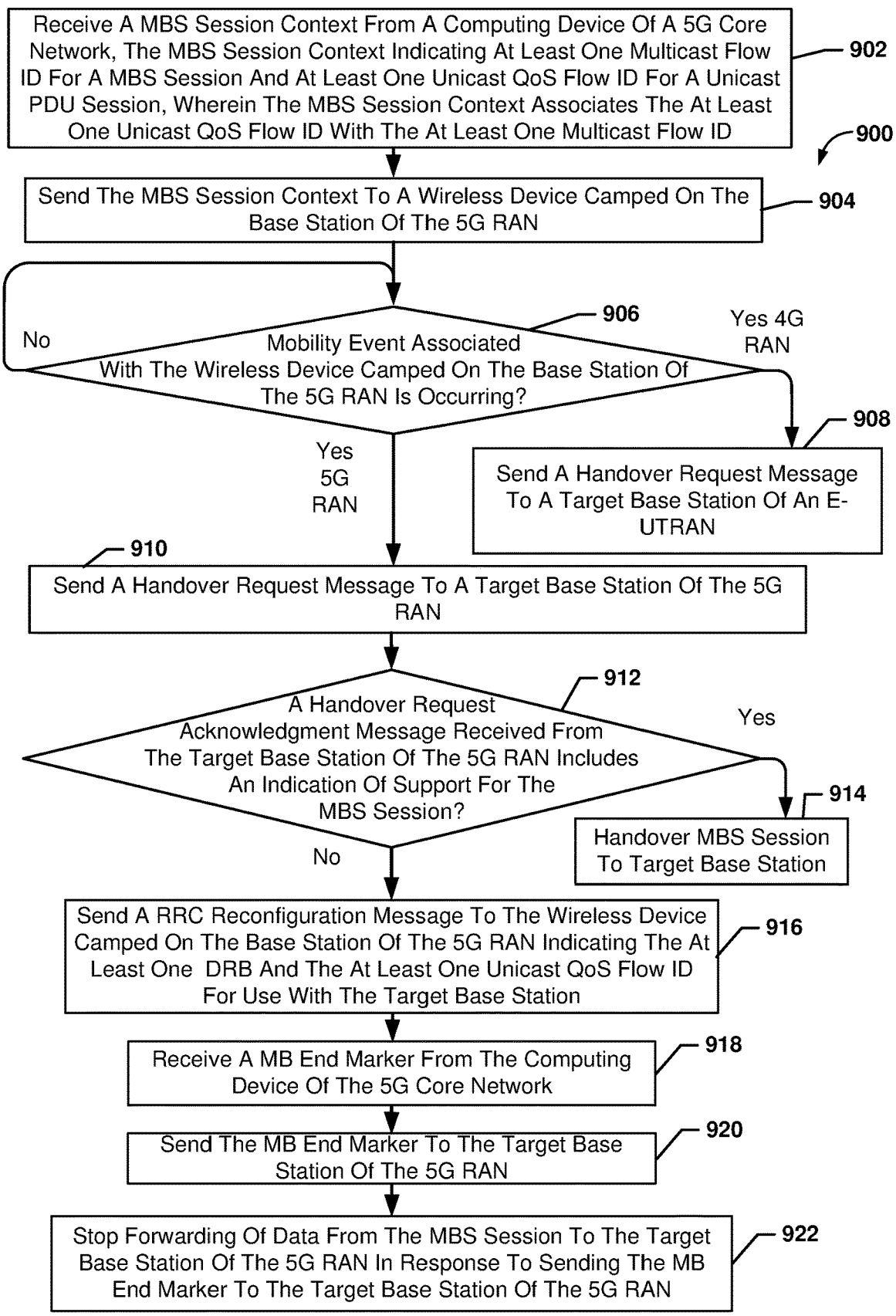
FIG. 9 is a process flow diagram illustrating a method that may be performed by a processor of a base station of a radio access network (RAN) for supporting an MBS session.

FIG. 9 is a process flow diagram illustrating a method 900 that may be performed by a processor of a base station of a RAN, such as a base station of a 5G RAN (or later generation RAN), for supporting an MBS session, such as a 5G MBS session. With reference to FIGS. 1A-9, the method 900 may be implemented by one or more processors (e.g., 210, 212, 214, 216, 218, 252, 260, 426) of a base station (e.g., base station 110a-d, RAN node 141, 350). With reference to FIGS. 1A-9, means for performing each of the operations of the method 900 may be one or more processors of a base station (e.g., base station 110a-d, RAN node 141, 350), such as one or more of the processors 210, 212, 214, 216, 218, 252, 260, 426, and/or the like. In some embodiments, the operations of method 900 may be performed in conjunction with the operations of method 500 (FIG. 5) and/or 700 (FIG. 7).

In block 902, the processor may receive an MBS session context from a computing device of a 5G core network, the MBS session context indicating at least one multicast flow ID for an MBS session and at least one unicast QoS flow ID for a unicast PDU session, wherein the MBS session context associates the at least one unicast QoS flow ID with the at least one multicast flow ID. The MBS session context may represent a single multicast session (e.g., for IP type, represents a single IP multicast group address). In the MBS session context, there may be one shared tunnel per multicast session. One multicast session may have multiple multicast flows. As one example, the MBS session context may be an MBS session context as illustrated in FIG. 6. The MBS session context may indicate a one-to-one association of QoS flows to multicast flows. As an example, the MBS session context may be received from a UPF computing device (e.g., UPF 145).

In block 904, the processor may send the MBS session context to a wireless device camped on the base station of the 5G RAN. In some embodiments, sending the MBS session context to the wireless device camped on the base station of the 5G RAN may be part of initial service establishment for the MBS service for the wireless device. In some embodiments, sending the MBS session context to the wireless device camped on the base station of the 5G RAN may occur after a PDU session for the associated unicast QoS flow ID has already been established with the wireless device camped on the base station of the 5G RAN. This post PDU session sending may occur when the wireless device was previously receiving the MBS service from another base station via unicast, handed over to the current base station, and may now be transitioning to multicast delivery for the MBS service.

In determination block 906, the processor may determine whether a mobility event associated with the wireless device camped on the base station of the 5G RAN is occurring. The mobility event may be triggered by a measurement report from the wireless device indicating the wireless device is moving to a neighbor cell or otherwise out of the coverage area of the base station of the 5G RAN. As part of determining whether a mobility event is occurring, the processor may also determine whether the mobility event is causing the wireless device to handover to a target base station that is a 5G RAN base station (e.g., a gNB) or a target base station that is a 4G RAN base station (e.g., an E-UTRAN or eNB).

In response to determining that a mobility event associated with the wireless device camped on the base station of the 5G RAN is not occurring (i.e., determination block 906="No"), the processor may continue to monitor for mobility events and determine whether a mobility event associated with the wireless device camped on the base station of the 5G RAN is occurring in determination block 906.

In response to determining that a mobility event associated with the wireless device camped on the base station of the 5G RAN is occurring to a 4G RAN base station (i.e., determination block 906="Yes 4G RAN"), the processor may send a handover request message to a target base station of an E-UTRAN in block 908. The handover request may indicate at least one DRB and the at least one unicast QoS flow ID. In this manner, base stations that cannot support MBS services, such as eNBs, may merely receive unicast flow information for provisioning the service upon handover.

In response to determining that a mobility event associated with the wireless device camped on the base station of the 5G RAN is occurring to a 5G RAN base station (i.e., determination block 906="Yes 5G RAN"), the processor may send a handover request message to a target base station of the 5G RAN in block 910. The handover request may indicate at least one DRB and the at least one unicast QoS flow ID and bearer and session information for the MBS session. In this manner, base stations that may be capable of supporting MBS services, such as gNBs, may receive both unicast and multicast flow information for provisioning the service upon handover. A target base station of the 5G RAN that is configured to support MBS services may recognize the information elements for the multicast flow information and support handover of the MBS session in multicast. A target base station of the 5G RAN that is not configured to support MBS services may not recognize the information elements for the multicast flow information and may ignore those elements while using the unicast information, such as the DRB and the associated unicast QoS flow ID to provision the MBS service via unicast upon handover.

In determination block 912, the processor may determine whether a handover request acknowledgment message received from the target base station of the 5G RAN includes an indication of support for the MBS session. For example, handover request acknowledgment message including no indication of MB context support may indicate the target base station of the 5G RAN does not support MBS service delivery via multicast. A handover request acknowledgment message including an indication of MB context support may indicate the target base station of the 5G RAN does support MBS service delivery via multicast.

In response to determining that the handover request acknowledgment message from the target base station includes an indication of support for the MBS session (i.e., determination block 912="Yes"), the processor may handover the MBS session to the target base station for multicast delivery in block 914.

In response to determining that the handover request acknowledgment message from the target base station does not include an indication of support for the MBS session (i.e., determination block 912="No"), the processor may send a RRC reconfiguration message to the wireless device camped on the base station of the 5G RAN indicating the at least one DRB and the at least one unicast QoS flow ID for use with the target base station in block 916. As the wireless device may currently be receiving the MBS service via multicast delivery, the receipt of the RRC reconfiguration message indicating the DRB and the associated unicast QoS flow ID may indicate to the wireless device the MBS delivery is going to transition from multicast to unicast upon handover to the target base station and that the target base station does not support MBS service delivery via multicast.

In block 918, the processor may receive a MB end marker from the computing device of the 5G core network. The MB end marker may indicate the packet is the last packet to be sent for the wireless device to the base station that had been previously provided multicast transport of the MBS service to the wireless device before the mobility event occurred. The MB end marker may trigger the processor to stop data forwarding to the target base station for the wireless device. The MB end marker may signal the handover event may be completed.

In block 920, the processor may send the MB end marker to the target base station of the 5G RAN. In this manner, the processor may signal to the target base station forwarding of the data for the wireless device is complete.

In block 922, the processor may stop forwarding of data from the MBS session to the target base station of the 5G RAN in response to sending the MB end marker to the target base station of the 5G RAN.

Figure 10A:
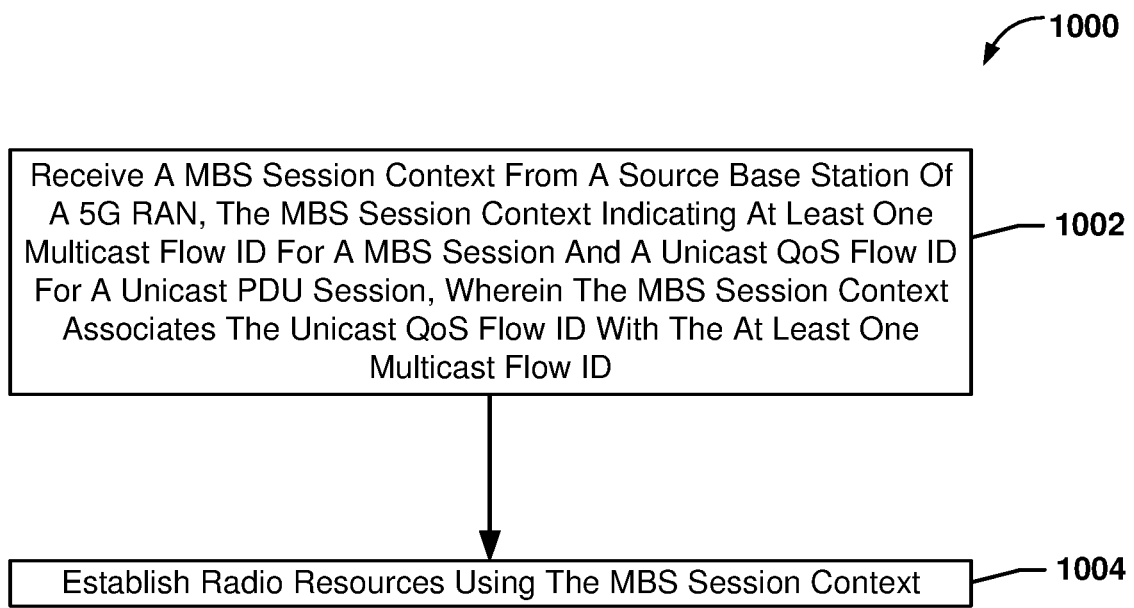
FIG. 10A is a process flow diagram illustrating a method that may be performed by a processor of a wireless device for supporting an MBS session.

FIG. 10A is a process flow diagram illustrating a method 1000 that may be performed by a processor of a wireless device for supporting an MBS session, such as a 5G MBS session. With reference to FIGS. 1A-10A, the method 1000 may be implemented by one or more processors (e.g., 210, 212, 214, 216, 218, 252, 260, 426) of a wireless device (e.g., 120*a-e*, 200, 320). With reference to FIGS. 1A-10A, means for performing each of the operations of the method 1000 may be one or more processors of a wireless device (e.g., 120*a-e*, 200, 320), such as one or more of the processors 210, 212, 214, 216, 218, 252, 260, 426, and/or the like. In some embodiments, the operations of method 1000 may be performed in conjunction with the operations of method 500 (FIG. 5), 700 (FIG. 7), and/or 900 (FIG. 9).

In block 1002, the processor may receive an MBS session context from a source base station of a 5G radio access network (RAN), the MBS session context indicating at least one multicast flow ID for an MBS session and at least one unicast QoS flow ID for a unicast PDU session, wherein the MBS session context associates the at least one unicast QoS flow ID with the at least one multicast flow ID. The MBS session context may represent a single multicast session (e.g., for IP type, represents a single IP multicast group address). In the MBS session context, there may be one shared tunnel per multicast session. One multicast session may have multiple multicast flows. As one example, the MBS session context may be an MBS session context as illustrated in FIG. 6. The MBS session context may indicate a one-to-one association of QoS flows to multicast flows. The source base station of the 5G RAN may be a base station configured to support MBS service delivery via multicast. In some embodiments, receiving the MBS session context from a source base station of the 5G RAN may be part of initial service establishment for the MBS service for the wireless device with the source base station when the wireless device first camps on the source base station. In some embodiments, receiving the MBS session context from a source base station of the 5G RAN may occur after a PDU session for the associated unicast QoS flow ID has already been established with the base station of the 5G RAN. This post PDU session reception may occur when the wireless device was previously receiving the MBS service from another base station via unicast, handed over to the source base station, and may now be transitioning to multicast delivery for the MBS service.

In block 1004, the processor may establish radio resources using the MBS session context. In some embodiments, establishing radio resources using the MBS session context may include establishing one or more radio resources of the wireless device according to the MBS session context to receive packets of a service in the MBS session from the source base station of the 5G RAN. In some embodiments, establishing radio resources using the MBS session context may include establishing one or more radio resources of the wireless device according to the DRB and the associated unicast QoS flow ID to receive packets of the service in a PDU session from a target base station of the 5G RAN. In some embodiments, establishing radio resources using the MBS session context may include establishing one or more radio resources of the wireless device according to the PDU session context and the associated unicast QoS flow ID to receive packets of the service in a PDU session from a base station of an E-UTRAN.

Figure 10B:
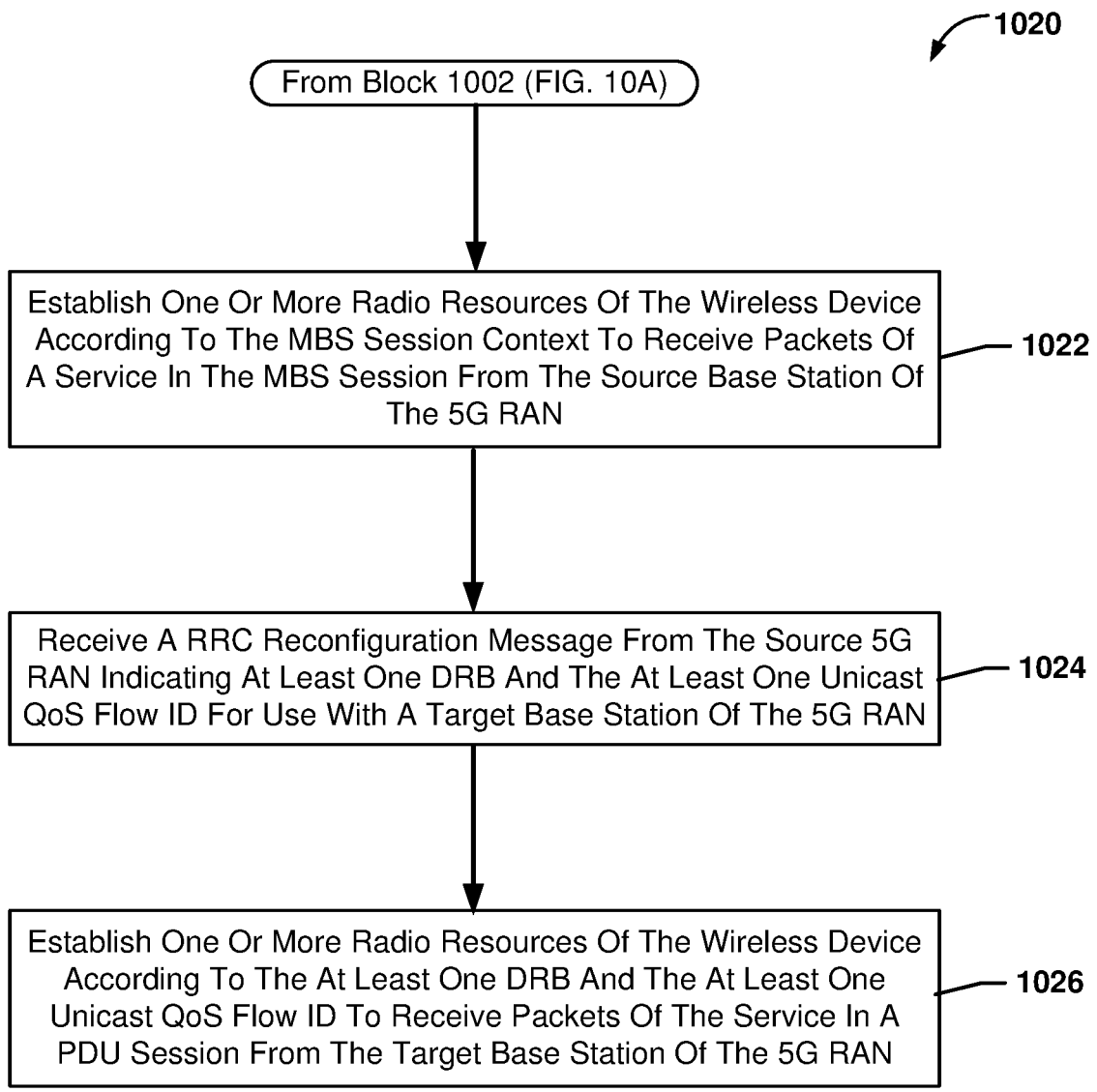
FIG. 10B is a process flow diagram illustrating a method that may be performed by a processor of a wireless device for supporting an MBS session.

FIG. 10B is a process flow diagram illustrating a method 1020 that may be performed by a processor of a wireless device for supporting an MBS session, such as a 5G MBS session. With reference to FIGS. 1A-10B, the method 1020 may be implemented by one or more processors (e.g., 210, 212, 214, 216, 218, 252, 260, 426) of a wireless device (e.g., 120*a-e*, 200, 320). With reference to FIGS. 1A-10B, means for performing each of the operations of the method 1020 may be one or more processors of a wireless device (e.g., 120*a-e*, 200, 320), such as one or more of the processors 210, 212, 214, 216, 218, 252, 260, 426, and/or the like. In some embodiments, the operations of method 1020 may be performed in conjunction with the operations of method 500 (FIG. 5), 700 (FIG. 7), 900 (FIG. 9), and/or 1000 (FIG. 10A). For example, the method 1020 may be performed as part of the operations of block 1004 (FIG. 10A) to establish radio resources using the MBS session context.

In block 1022, the processor may establish one or more radio resources of the wireless device according to the MBS session context to receive packets of a service in the MBS session from the source base station of the 5G RAN. For example, the processor may establish one or more radio resources to receive the MBS service via multicast delivery.

In block 1024, the processor may receive a radio resource control (RRC) reconfiguration message from the source base station of the 5G RAN indicating at least one data radio bearer (DRB) and the at least one unicast QoS flow ID for use with a target base station of the 5G RAN. The RRC reconfiguration message may indicate that the MBS service may not be available via multicast delivery from the target base station to which the wireless device is handing over. As the wireless device may currently be receiving the MBS service via multicast delivery, the receipt of the RRC reconfiguration message indicating the DRB and the associated unicast QoS flow ID may indicate to the wireless device the MBS delivery is going to transition from multicast to unicast upon handover to the target base station and that the target base station does not support MBS service delivery via multicast.

In block 1026, the processor may establish one or more radio resources of the wireless device according to the at least one DRB and the at least one unicast QoS flow ID to receive packets of the service in a PDU session from the target base station of the 5G RAN. For example, the processor may establish one or more radio resources according to settings in RRC messages from the source base station and/or target base station, including the DRB and the associated unicast QoS flow ID, to receive packets of the service in a PDU session from the target base station of the 5G RAN.

Figure 10C:
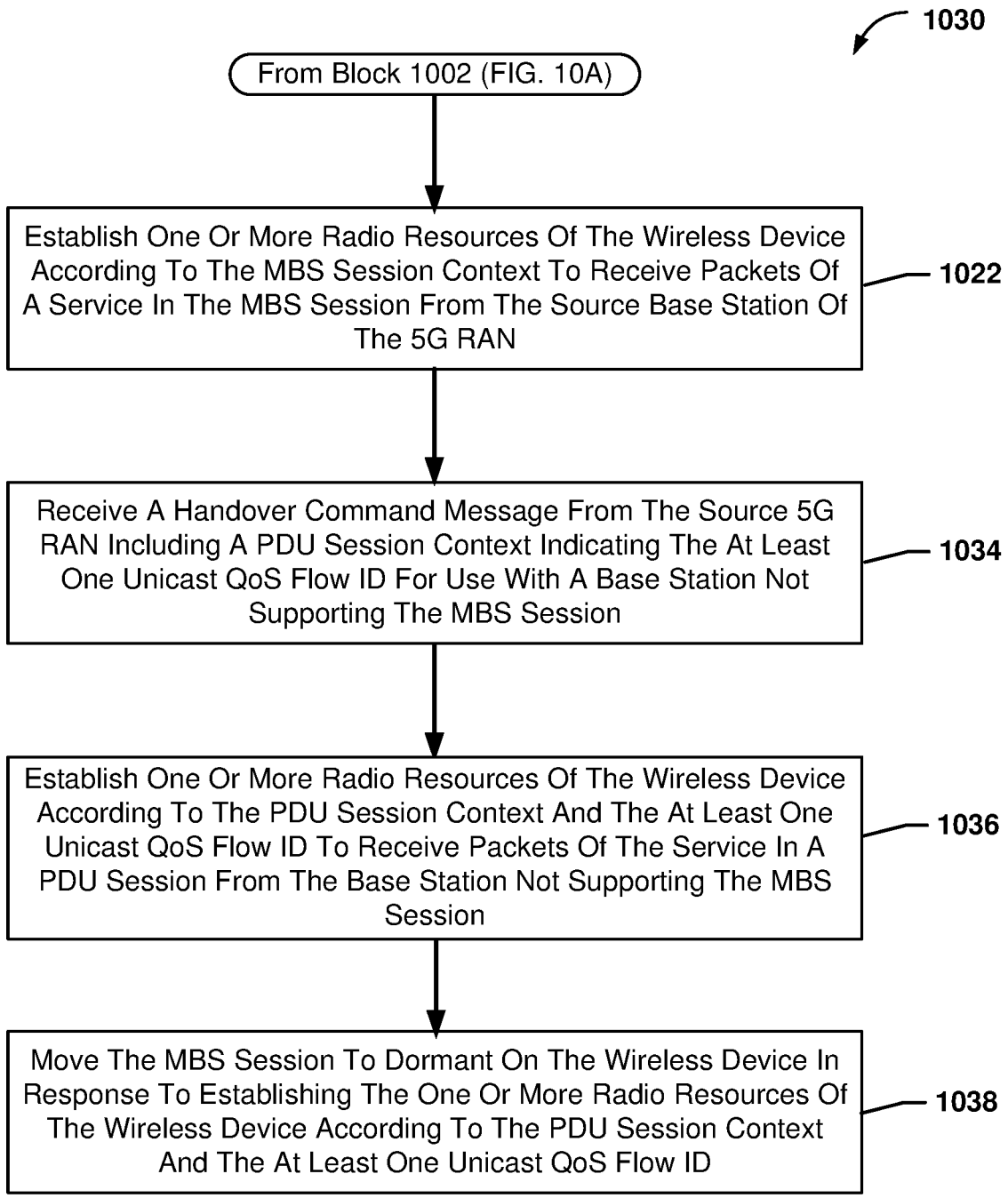
FIG. 10C is a process flow diagram illustrating a method that may be performed by a processor of a wireless device for supporting an MBS session.

FIG. 10C is a process flow diagram illustrating a method 1030 that may be performed by a processor of a wireless device for supporting an MBS session, such as a 5G MBS session. With reference to FIGS. 1A-10C, the method 1030 may be implemented by one or more processors (e.g., 210, 212, 214, 216, 218, 252, 260, 426) of a wireless device (e.g., 120a-e, 200, 320). With reference to FIGS. 1A-10C, means for performing each of the operations of the method 1030 may be one or more processors of a wireless device (e.g., 120a-e, 200, 320), such as one or more of the processors 210, 212, 214, 216, 218, 252, 260, 426, and/or the like. In some embodiments, the operations of method 1030 may be performed in conjunction with the operations of method 500 (FIG. 5), 700 (FIG. 7), 900 (FIG. 9), 1000 (FIG. 10A), and/or 1020 (FIG. 10B). For example, the method 1030 may be performed as part of the operations of block 1004 (FIG. 10A) to establish radio resources using the MBS session context.

In block 1022, the processor may establish one or more radio resources of the wireless device according to the MBS session context to receive packets of a service in the MBS session from the source base station of the 5G RAN as discussed with reference to method 1020 (FIG. 10B).

In block 1034, the processor may receive a handover command message from the source base station of the 5G RAN including a packet data unit (PDU) session context indicating the at least one unicast QoS flow ID for use with a base station of an Evolved Universal Terrestrial Radio Access Network (E-UTRAN). The handover command message may indicate that the MBS service is not be available via multicast delivery from the base station of the E-UTRAN to which the wireless device is handing over. As the wireless device may currently be receiving the MBS service via multicast delivery, the receipt of the handover command message indicating the DRB and the associated unicast QoS flow ID may indicate to the wireless device the MBS delivery is going to transition from multicast to unicast upon handover to the base station of the E-UTRAN and that the base station of the E-UTRAN does not support MBS service delivery via multicast.

In block 1036, the processor may establish one or more radio resources of the wireless device according to the PDU session context and the at least one unicast QoS flow ID to receive packets of the service in a packet data unit (PDU) session from the base station of the E-UTRAN. For example, the processor may establish one or more radio resources according to settings in RRC messages and/or handover commands from the source base station and/or base station of the E-UTRAN, including the DRB and the associated unicast QoS flow ID, to receive packets of the service in a PDU session from the target base station of the base station of the E-UTRAN.

In block 1038, the processor may move the MBS session to dormant on the wireless device in response to establishing the one or more radio resources of the wireless device according to the PDU session context and the at least one unicast QoS flow ID. Moving the MBS session to dormant may support the MBS session being reactivated at a later time should the wireless device camp on a base station supporting multicast delivery.

Figure 11:
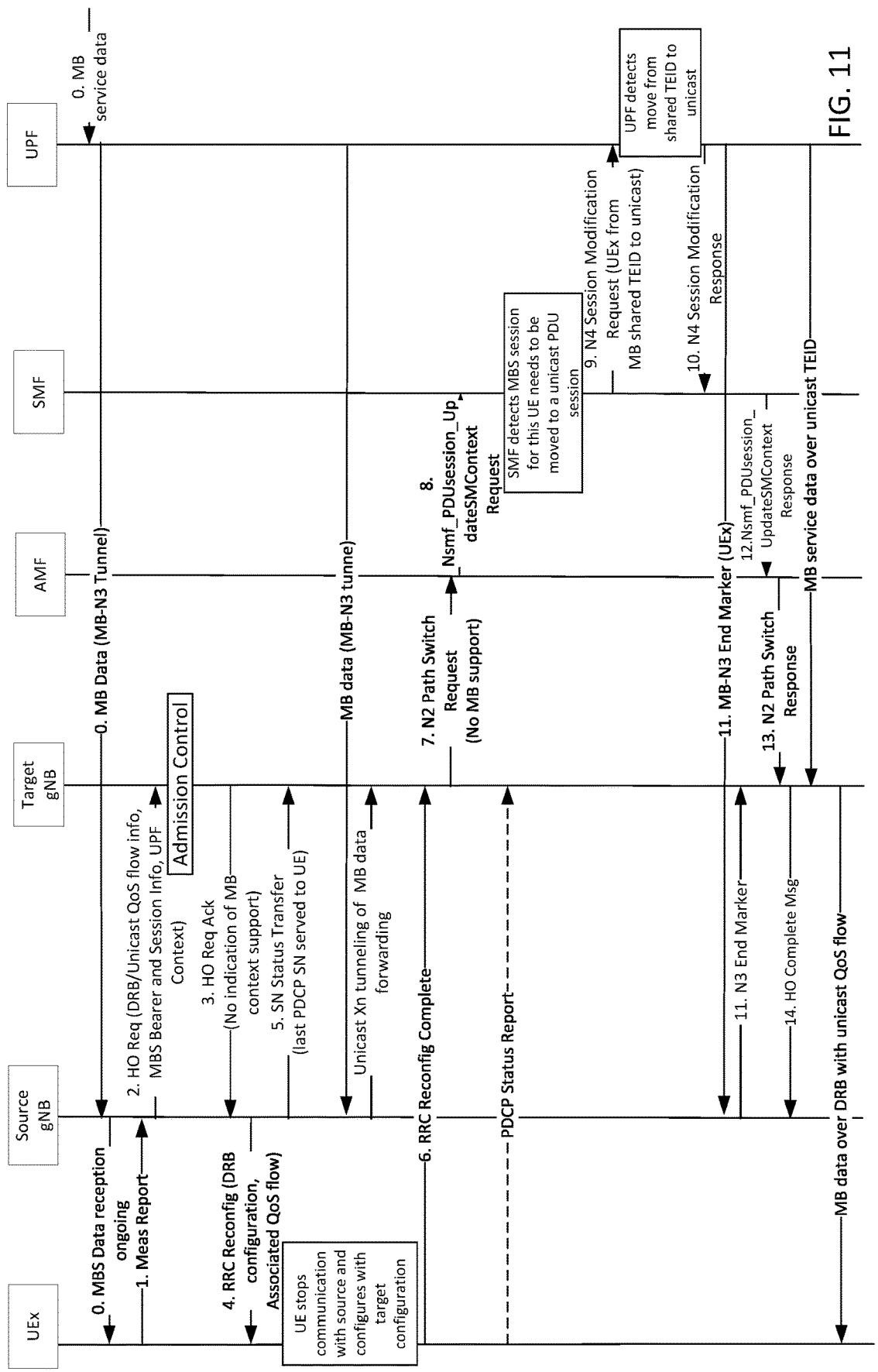
FIG. 11 is a call flow diagram illustrating example interactions between devices for supporting wireless device mobility in a 5G MBS session from an MBS supporting RAN node to a non-MBS supporting RAN node in accordance with various embodiments.

FIG. 11 is a call flow diagram illustrating example interactions between devices for supporting wireless device mobility in a 5G MBS session from an MBS supporting RAN node (e.g., base station 110a-e, RAN node 141) to a non-MBS supporting RAN node (e.g., base station 110a-e, RAN node 141) in accordance with various embodiments. With reference to FIGS. 1A-11, the operations illustrated in FIG. 11 may support connected mode mobility from an MBS supporting RAN node (e.g., base station 110a-e, RAN node 141) to a non-MBS supporting RAN node (e.g., base station 110a-e, RAN node 141). In some embodiments, the interactions illustrated in FIG. 11 may be interactions resulting from various devices, such as a wireless device (e.g., wireless device 120a-e)(labeled UEx in FIG. 11), MBS supporting base station (e.g., base station 110a-d, RAN node 141)(labeled Source gNB in FIG. 11), and/or one or more computing devices of a 5G core network (e.g., SMF 144 and/or UPF 145)(labeled SMF and UPF, respectively, in FIG. 11), according to one or more operations of methods 500 (FIG. 5), 700 (FIG. 7), 900 (FIG. 9), 1000 (FIG. 10A), 1020 (FIG. 10B), and/or 1030 (FIG. 10C) to support a 5G MBS session. Specifically, FIG. 11 illustrates at step 2 that a handover request is sent from the source gNB to the target gNB indicating the unicast and multicast information for the MBS session (e.g., DBR/Unicast QoS flow information, MBS Bearer and Session information, and user plane function (UPF) context). The target gNB responding with a handover acknowledgment in step 3 with no indication of MB context support may indicate to the source gNB that the target gNB does not support MBS. The source gNB may send an RRC reconfiguration message to the wireless device indicating the DRB configuration and associated QoS flow to support unicast delivery of the packets of the service from the target gNB once the wireless device is camped on the target gNB. The MB data from the UPF may be forwarded from the source gNB to the target gNB while the mobility event is occurring. The path switch request on the N2 interface at step 7 from the target gNB to the AMF may include no indication of MB support. The SMF may detect that the MBS session for the wireless device needs to be moved to a unicast PDU session based on the update request from the AMF. The SMF may send a session modification request to the UPF in step 9 (e.g., on the N4 interface). The session modification request may indicate the wireless device needs to be transitioned from a shared MB TEID to a unicast TEID. In response to the session modification request, the UPF may move the delivery to the wireless device from multicast (e.g., via a shared MB TEID) to unicast (e.g., via a unicast TEID). The UPF may also insert an end marker into a last packet of the service for the wireless device to be carried in the MBS session in response to moving the wireless device receiving the service in the MBS session from the MB shared TEID to the unicast TEID. Upon receiving the end marker in step 11, the source gNB may send the end marker and stop forwarding data to the target gNB as handover may be complete. The MB service data may be sent via the unicast TEID from the UPF to the target gNB and the target gNB may provide the packets of the service (i.e., the data) to the wireless device via unicast delivery going forward.

In some embodiments, transitioning from a non-MBS supporting RAN node (e.g., base station 110a-e, RAN node 141) to an MBS supporting RAN node (e.g., base station 110a-e, RAN node 141) may occur when a wireless device (e.g., wireless device 120a-e) is already receiving an MBS service via a unicast PDU session associated with an MBS session context. Handover may proceed as usual, except that the AMF may signal to the SMF (e.g., SMF 144) that that target RAN (e.g., base station 110a-d, RAN node 141) supports MBS transport. At completion of handover the wireless device (e.g., wireless device 120a-e) will still have a unicast PDU session active. The SMF (e.g., SMF 144) may reconfigure the UPF (e.g., UPF 145) to change from unicast tunnel to shared tunnel for that wireless device (e.g., wireless device 120a-e). The SMF (e.g., SMF 144) may send a message to the target RAN (e.g., base station 110a-d, RAN node 141) that the wireless device (e.g., wireless device 120a-e) is now camped on (i.e., the RAN node supporting MBS) to release unicast QoS flows and establish associated MBS contexts. The UPF (e.g., UPF 145) may send over a unicast general Packet Radio service (GPRS) tunnel protocol (GTP)-unicast (GTP-U) tunnel an end-marker with the associated sequence number for the associated shared tunnel for the next packet. When the target RAN (e.g., base station 110a-d, RAN node 141) receives the end-marker, the target RAN (e.g., base station 110a-d, RAN node 141) may start RRC reconfiguration to move the wireless device (e.g., wireless device 120a-e) to the MBS QoS flow, and provides the wireless device (e.g., wireless device 120a-e) with information of the Packet Data Convergence Protocol (PDCP) sequence number of the packet following the last one received in the unicast QoS flows. After that last packet, the target RAN (e.g., base station 110a-d, RAN node 141) may being MBS delivery of the service and stop unicast delivery.

Figure 12:
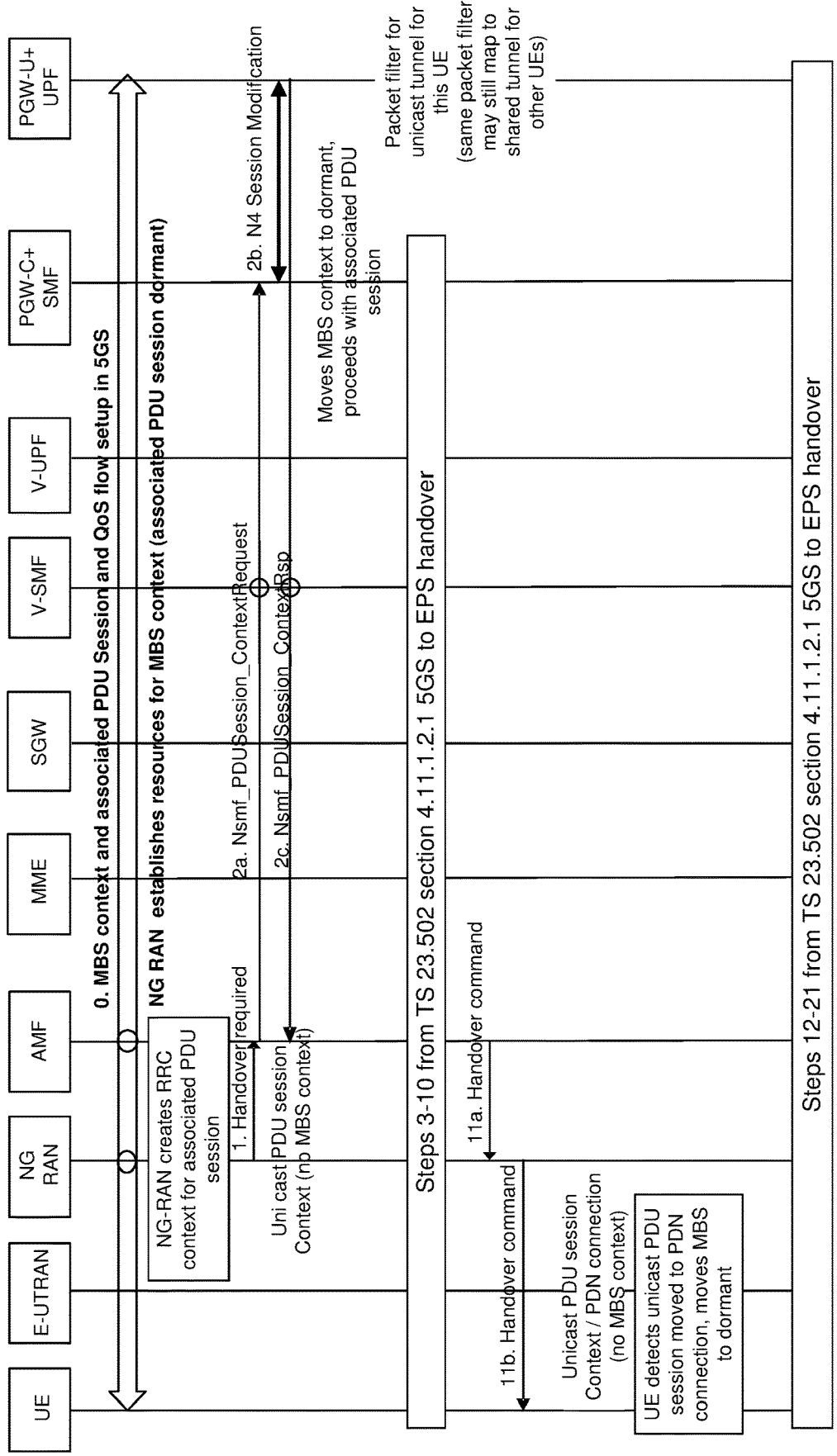
FIG. 12 is a call flow diagram illustrating example interactions between devices for supporting wireless device mobility in a 5G MBS session from a 5G system to an Evolved Packet System (EPS) in accordance with various embodiments.

FIG. 12 is a call flow diagram illustrating example interactions between devices for supporting wireless device mobility in a 5G MBS session from a 5G system to an EPS in accordance with various embodiments. With reference to FIGS. 1A-12, the operations illustrated in FIG. 12 may support connected mode mobility from a 5G system (e.g., 5GNR network 160) to an LTE network (e.g., a network including an EPC and E-UTRAN). In some embodiments, the interactions illustrated in FIG. 12 may be interactions resulting from various devices, such as a wireless device (e.g., wireless device 120a-e)(labeled UE in FIG. 12), MBS supporting base station (e.g., base station 110a-d, RAN node 141)(labeled NG RAN in FIG. 12), one or more computing devices of a 5G core network (e.g., SMF 144 and/or UPF 145)(labeled V-SMF and V-UPF, respectively, in FIG. 12), one or more computing devices of a 4G core network (e.g., packet gateways (PGWs), and/or one or more LTE base stations (e.g., base station 110a-d)(labeled E-UTRAN in FIG. 12), according to one or more operations of methods 500 (FIG. 5), 700 (FIG. 7), 900 (FIG. 9), 1000 (FIG. 10A), 1020 (FIG. 10B), and/or 1030 (FIG. 10C) to support a 5G MBS session. FIG. 12 illustrates that as part of the mobility operations from the NG-RAN to the E-UTRAN, the NG-RAN creates an RRC context for the associated PDU session of the MBS session being provided to the wireless device. The unicast PDU session context is then used for handover as the E-UTRAN will not support MBS contexts. The MBS context is moved to dormant and the packet filter is moved to unicast for that transitioning wireless device moving to the E-UTRAN. The handover signaling from the NG-RAN to the wireless device indicates only the unicast PDU session context. The wireless device detects the unicast PDU session has moved to a PDN connection and moves the MBS to dormant. Other handover steps may be performed according to the operations of steps 3-10 and 12-21 in 3GPP Technical Specification (TS) 23.502 section 4.11.1.2.1 for 5GS to EPS handover.

Figure 13:
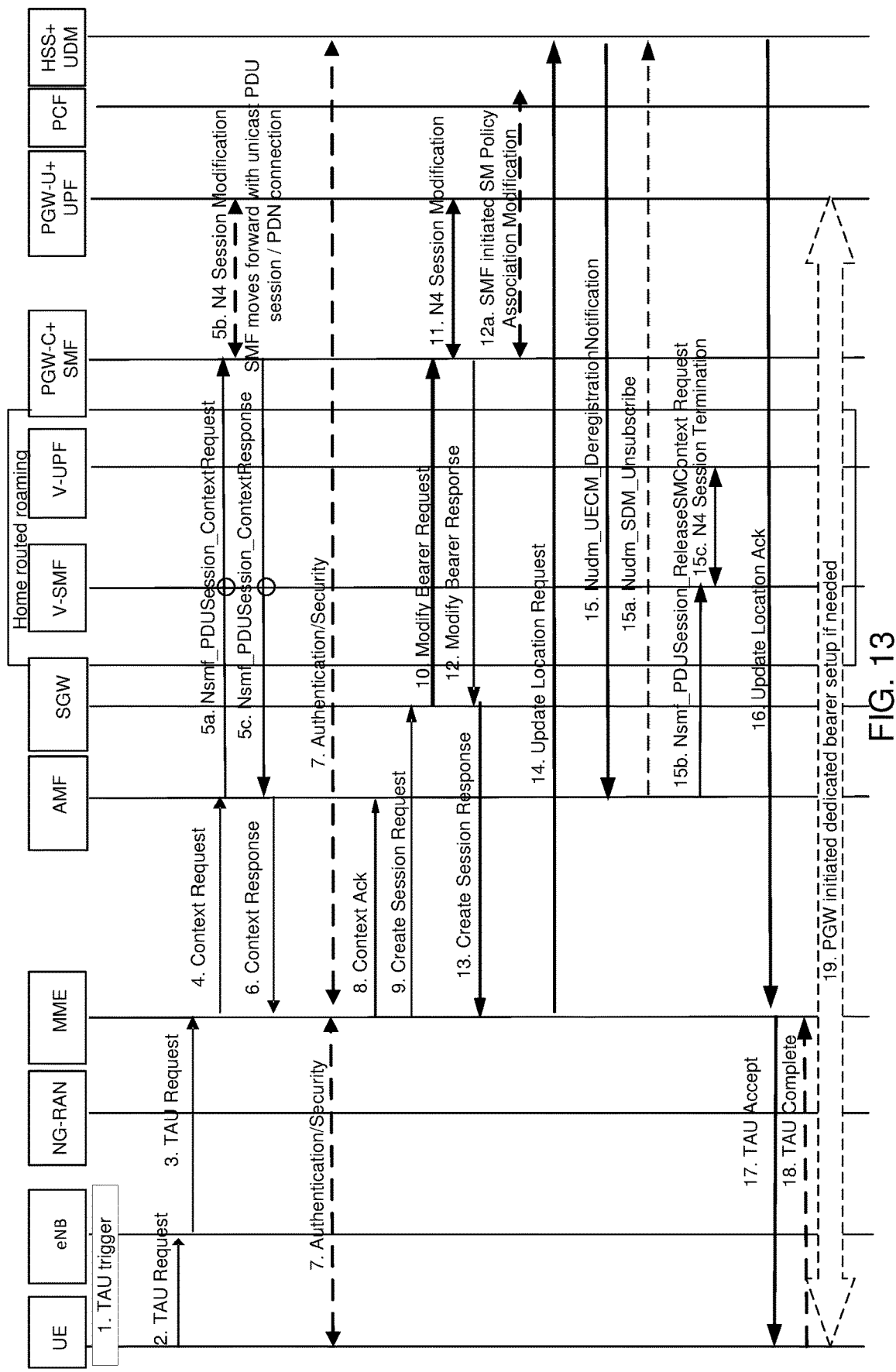
FIG. 13 is a call flow diagram illustrating example interactions between devices for supporting wireless device mobility in a 5G MBS session from a 5G core to an Evolved Packet Core (EPC) in idle mode in accordance with various embodiments.

FIG. 13 is a call flow diagram illustrating example interactions between devices for supporting wireless device mobility in a 5G MBS session from a 5G core to an EPC in idle mode in accordance with various embodiments. With reference to FIGS. 1A-13, the operations illustrated in FIG. 13 may support idle mode mobility from a 5G core network (e.g., core network 140, 148) to an EPC. In some embodiments, the interactions illustrated in FIG. 13 may be interactions resulting from various devices, such as a wireless device (e.g., wireless device 120a-e)(labeled UE in FIG. 13), MBS supporting base station (e.g., base station 110a-d, RAN node 141, labeled NG-RAN in FIG. 13), one or more computing devices of a 5G core network (e.g., SMF 144 and/or UPF 145)(labeled V-SMF and V-UPF, respectively, in FIG. 13), one or more computing devices of a 4G core network (e.g., packet gateways (PGWs), PCFs, etc.), and/or one or more LTE base stations (e.g., base station 110a-d) (labeled eNB in FIG. 13), according to one or more operations of methods 500 (FIG. 5), 700 (FIG. 7), 900 (FIG. 9), 1000 (FIG. 10A), 1020 (FIG. 10B), and/or 1030 (FIG. 10C) to support a 5G MBS session. FIG. 13 illustrates that the SMF detects mobility to an EPC and moves forward with the associated unicast PDU session/PDN connection. The SMF and the wireless device may keep the MBS context dormant. In some embodiments, EPC to 5G core mobility may proceed in a similar manner. If the wireless device and P-GW-C/SMF had already established a PDU session/MBS context association for a still valid MBS context, the SMF moves forward with the MBS context. The wireless device may learn that the MBS context is active in the list of activated PDU sessions (e.g., extended to include MBS context) or alternatively with a separate information element (IE). The base station configures the wireless device with the multimedia radio bearer (MRB) or DRB for the MBS context. If there was no MBS context established yet, regular discovery and MBS context establishment procedures may apply.

Figure 14:
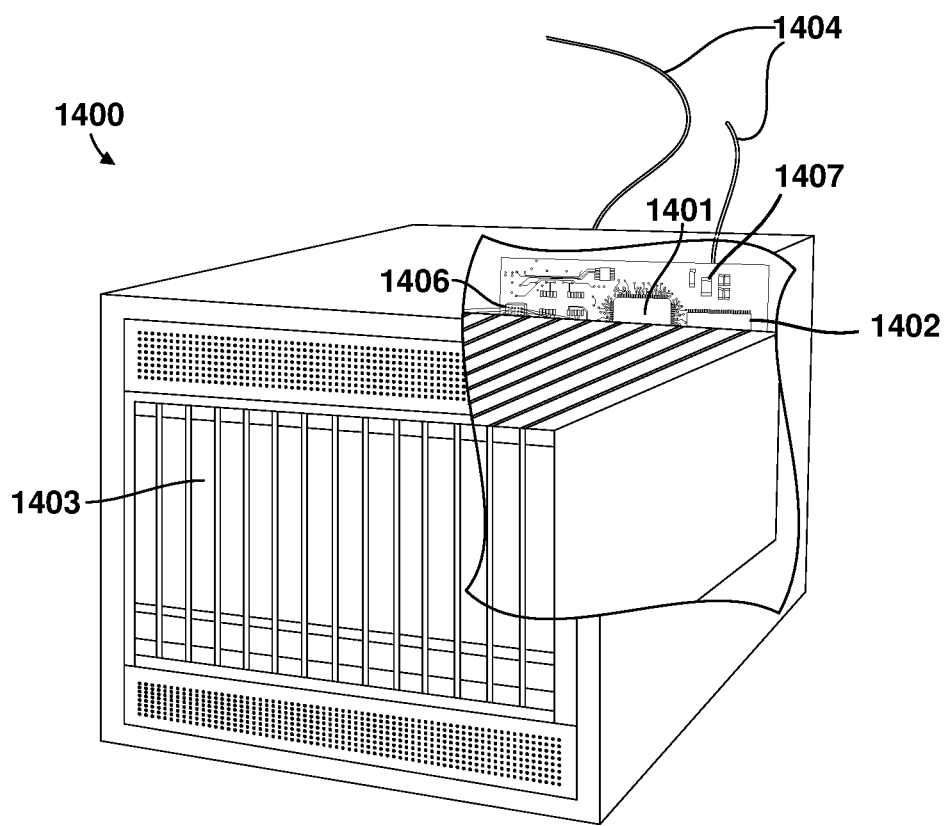
FIG. 14 is a component block diagram of a network computing device suitable for use with various embodiments.

FIG. 14 is a component block diagram of a network computing device 1400 suitable for use with various embodiments. With reference to FIGS. 1A-14, various embodiments may be implemented on a variety of network computing devices 1400 (e.g., base station 110*a-e*, RAN node 141, SMF 144, UPF 145, 350), an example of which is illustrated in FIG. 14 in the form of a base station server or network server. Such network computing devices may include at least the components illustrated in FIG. 14. The network computing device 1400 may include a processor 1401 coupled to volatile memory 1402 and a large capacity nonvolatile memory, such as a disk drive 1403. The network computing device 1400 may also include a peripheral memory access device such as a floppy disc drive, compact disc (CD) or digital video disc (DVD) drive 1406 coupled to the processor 1401. The network computing device 1400 may also include network access ports 1404 (or interfaces) coupled to the processor 1401 for establishing data connections with a network, such as the Internet and/or a local area network coupled to other system computers and servers. The network computing device 1400 may include one or more antennas 1407 for sending and receiving electromagnetic radiation that may be connected to a wireless communication link. The network computing device 1400 may include additional access ports, such as USB, Firewire, Thunderbolt, and the like for coupling to peripherals, external memory, or other devices.

Figure 15:
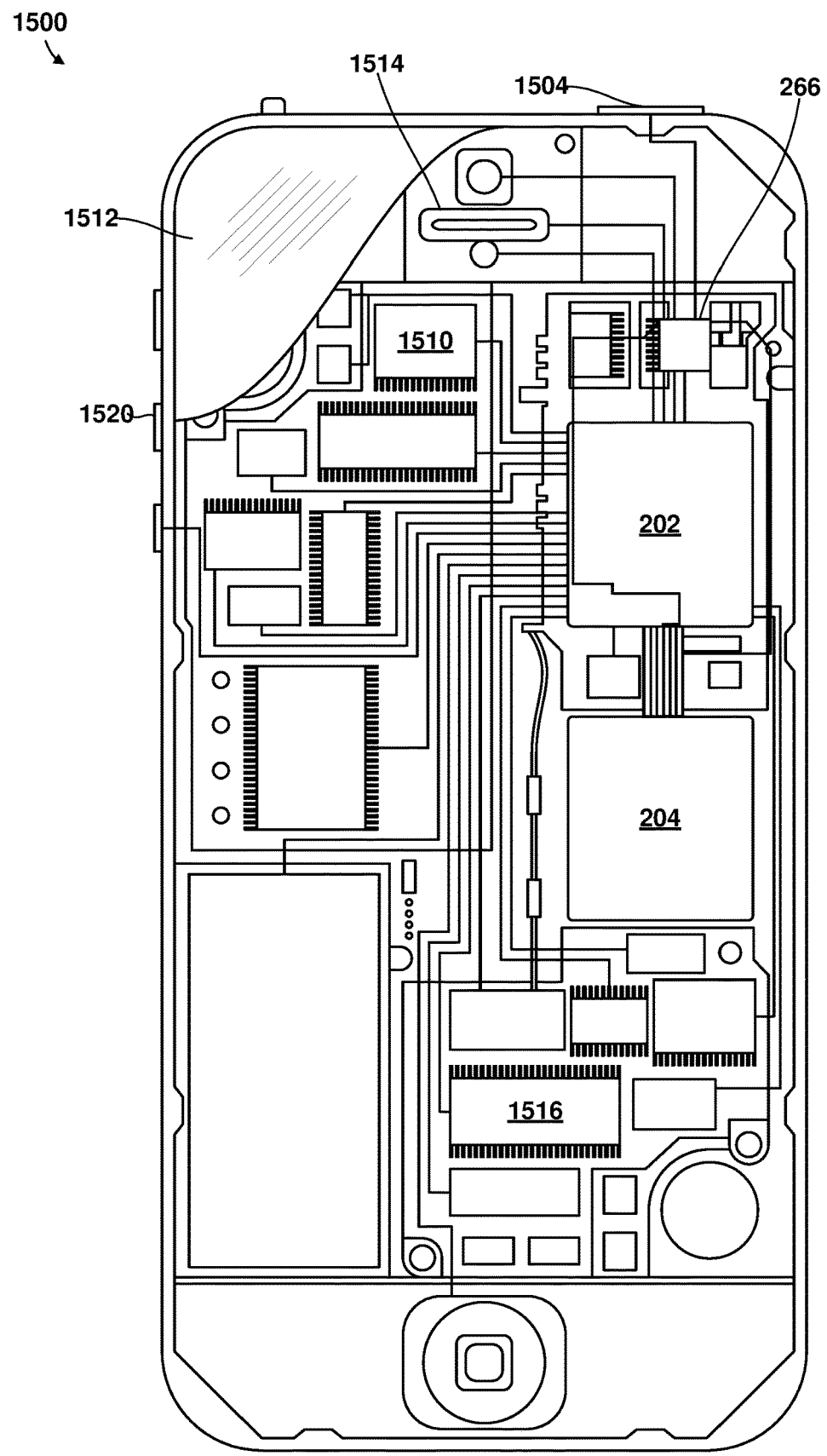
FIG. 15 is a component block diagram of a wireless device suitable for use with various embodiments.

FIG. 15 is a component block diagram of a wireless device 1500 suitable for use with various embodiments. With reference to FIGS. 1A-15, various embodiments may be implemented on a variety of wireless device 1500 (e.g., the wireless device 120*a*-120*e*, 200, 320), an example of which is illustrated in FIG. 15 in the form of a smartphone. The wireless device 1500 may include a first SOC 202 (e.g., a SOC-CPU) coupled to a second SOC 204 (e.g., a 5G capable SOC). The first and second SOCs 202, 204 may be coupled to internal memory 1516, a display 1512, and to a speaker 1514. Additionally, the wireless device 1500 may include an antenna 1504 for sending and receiving electromagnetic radiation that may be connected to a wireless transceiver 266 coupled to one or more processors in the first and/or second SOCs 202, 204. The wireless device 1500 may also include menu selection buttons or rocker switches 1520 for receiving user inputs.

The wireless device 1500 also includes a sound encoding/decoding (CODEC) circuit 1510, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 1510 may include a digital signal processor (DSP) circuit (not shown separately).

The processors of the wireless network computing device 1400 and the wireless device 1500 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Software applications may be stored in the memory before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), LTE systems, third generation wireless mobile communication technology (3G), fourth generation wireless mobile communication technology (4G), fifth generation wireless mobile communication technology (5G) as well as later generation 3GPP technology, global system for mobile communications (GSM), universal mobile telecommunications system (UMTS), 3GSM, general Packet Radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 700, 900, 1000, 1020, and/or 1030 may be substituted for or combined with one or more operations of the methods 500, 700, 900, 1000, 1020, and/or 1030.

Implementation examples are described in the following paragraphs. While some of the following implementation examples are described in terms of example methods, further example implementations may include: the example methods discussed in the following paragraphs implemented by a wireless device including a processor configured to perform operations of the example methods; the example methods discussed in the following paragraphs implemented by a wireless device including means for performing functions of the example methods; and the example methods discussed in the following paragraphs implemented as a non-transitory processor-readable storage medium having stored thereon processor-executable instructions configured to cause a processor of a wireless device to perform the operations of the example methods.

Example 1. A method performed by a processor of a wireless device for supporting a multicast/broadcast service (MBS) session, including: receiving a MBS session context from a source base station of a radio access network (RAN), the MBS session context indicating at least one multicast flow identifier (ID) for an MBS session and at least one unicast Quality of Service (QoS) flow ID for a unicast Packet Data Unit (PDU) session, in which the at least one unicast QoS flow ID is associated with the at least one multicast flow ID; and establishing radio resources using the MBS session context.

Example 2. The method of example 1, in which the source base station of the RAN is a fifth generation (5G) RAN.

Example 3. The method of example 2, in which establishing radio resources using the MBS session context includes: establishing one or more radio resources of the wireless device according to the MBS session context to receive packets of a service in the MBS session from the source base station of the 5G RAN; receiving a radio resource control (RRC) reconfiguration message from the source base station of the 5G RAN indicating at least one data radio bearer (DRB) and the at least one unicast QoS flow ID for use with a target base station of the 5G RAN; and establishing one or more radio resources of the wireless device according to the at least one DRB and the at least one unicast QoS flow ID to receive packets of the service in a PDU session from the target base station of the 5G RAN.

Example 4. The method of example 2, in which establishing radio resources using the MBS session context includes: establishing one or more radio resources of the wireless device according to the MBS session context to receive packets of a service in the MBS session from the source base station of the 5G RAN; receiving a handover command message from the source base station of the 5G RAN including a PDU session context indicating the at least one unicast QoS flow ID for use with a base station not supporting the MBS session; establishing one or more radio resources of the wireless device according to the PDU session context and the at least one unicast QoS flow ID to receive packets of the service in a PDU session from the base station not supporting the MBS session; and moving the MBS session to dormant on the wireless device in response to establishing the one or more radio resources of the wireless device according to the PDU session context and the at least unicast QoS flow ID.

Example 5. The method of example 4, in which the base station not supporting the MBS session is a base station of an Evolved Universal Terrestrial Radio Access Network (E-UTRAN).

Example 6. The method of any of examples 2-5, in which receiving the MBS session context from the source base station of the 5G RAN occurs after a PDU session for the at least one unicast QoS flow ID has already been established by one or more radio resources of the wireless device to receive packets of a service, the method further including: establishing one or more radio resources of the wireless device according to the MBS session context to receive packets of the service in the MBS session from the source base station of the 5G RAN.

Implementation examples are described in the following paragraphs. While some of the following implementation examples are described in terms of example methods, further example implementations may include: the example methods discussed in the following paragraphs implemented by a base station including a processor configured to perform operations of the example methods; the example methods discussed in the following paragraphs implemented by a base station including means for performing functions of the example methods; and the example methods discussed in the following paragraphs implemented as a non-transitory processor-readable storage medium having stored thereon processor-executable instructions configured to cause a processor of a base station to perform the operations of the example methods.

Example 7. A method performed by a processor of a base station of a radio access network (RAN) for supporting a multicast/broadcast service (MBS) session, including: receiving a MBS session context from a computing device of a core network, the MBS session context indicating at least one multicast flow identifier (ID) for an MBS session and at least one unicast Quality of Service (QoS) flow ID for a unicast Packet Data Unit (PDU) session, in which the MBS session context associates the at least one unicast QoS flow ID with the at least one multicast flow ID; and sending the MBS session context to a wireless device camped on the base station of the RAN.

Example 8. The method of example 7, further including: sending a handover request message to a target base station of the RAN in response to determining that a mobility event associated with the wireless device camped on the base station of the RAN is occurring, the handover request message indicating at least one data radio bearer (DRB) and the at least unicast QoS flow ID and bearer and session information for the MBS session.

Example 9. The method of example 8, further including: determining whether a handover request acknowledgment message received from the target base station of the RAN includes an indication of support for the MBS session; and sending a radio resource control (RRC) reconfiguration message to the wireless device camped on the base station of the 5G RAN indicating the at least one DRB and the at least one unicast QoS flow ID for use with the target base station in response to determining that the handover request acknowledgment message from the target base station does not include an indication of support for the MBS session.

Example 10. The method of example 9, further including: receiving a multicast/broadcast (MB) end marker from the computing device of the core network; sending the MB end marker to the target base station of the RAN; and stopping forwarding of data from the MBS session to the target base station of the RAN in response to sending the MB end marker to the target base station of the RAN.

Example 11. The method of any of examples 7-10, further including: sending a handover request message to a target base station of an Evolved Universal Terrestrial Radio Access Network (E-UTRAN) in response to determining that a mobility event associated with the wireless device camped on the base station of the RAN is occurring, the handover request message indicating at least one data radio bearer (DRB) and the at least one unicast QoS flow ID.

Example 12. The method of any of examples 7-11, in which sending the MBS session context to the wireless device camped on the base station of the RAN occurs after a PDU session for the at least one unicast QoS flow ID has already been established with the wireless device camped on the base station of the RAN.

Example 13. The method of any of examples 7-12, in which the computing device of the core network is a User Plane Function (UPF) computing device of a fifth generation (5G) core network.

Implementation examples are described in the following paragraphs. While some of the following implementation examples are described in terms of example methods, further example implementations may include: the example methods discussed in the following paragraphs implemented by a computing device including a processor configured to perform operations of the example methods; the example methods discussed in the following paragraphs implemented by a computing device including means for performing functions of the example methods; and the example methods discussed in the following paragraphs implemented as a non-transitory processor-readable storage medium having stored thereon processor-executable instructions configured to cause a processor of a computing device to perform the operations of the example methods.

Example 14. A method performed by a processor of a computing device of a core network for supporting a multicast/broadcast service (MBS) session, including: generating a MBS session context for a service in which packets are to be provided via both MBS and unicast, the MBS session context indicating at least one multicast flow identifier (ID) for an MBS session and at least one unicast Quality of Service (QoS) flow ID for a unicast Packet Data Unit (PDU) session, in which the MBS session context associates the at least one unicast QoS flow ID with the at least one multicast flow ID; and sending the MBS session context to another computing device of the core network configured to provide packets of the service to base stations of radio access networks via both MBS and unicast.

Example 15. The method of example 14, further including: determining that the MBS session needs to be moved to a unicast PDU session for a wireless device receiving the service in the MBS session; and sending a session modification request to the other computing device of the core network indicating that the wireless device receiving the service in the MBS session needs to be moved from a multicast/broadcast (MB) shared tunnel endpoint ID (TEID) to a unicast TEID.

Example 16. The method of any of examples 14-15, in which the computing device of the core network is a Session Management Function (SMF) computing device of a fifth generation (5G) core network and the other computing device of the core network is a User Plane Function (UPF) computing device of the 5G core network.

Example 17. A method performed by a processor of a computing device of a core network for supporting a multicast/broadcast service (MBS) session, including: receiving a MBS session context for a service in which packets are to be provided via both MBS and unicast from another computing device of the core network, the MBS session context indicating at least one multicast flow identifier (ID) for an MBS session and at least one unicast Quality of Service (QoS) flow ID for a unicast Packet Data Unit (PDU) session, in which the MBS session context associates the at least one unicast QoS flow ID with the at least one multicast flow ID; and sending the MBS session context to a base station of a radio access network (RAN) configured to support MBS.

Example 18. The method of example 17, further including: receiving a session modification request from the other computing device of the core network indicating that a wireless device receiving the service in the MBS session needs to be moved from a multicast/broadcast (MB) shared tunnel endpoint ID (TEID) to a unicast TEID; and moving the wireless device receiving the service in the MBS session from the MB shared TEID to the unicast TEID.

Example 19. The method of example 18, further including: inserting a MB end marker into a last packet of the service for the wireless device to be carried in the MBS session in response to moving the wireless device receiving the service in the MBS session from the MB shared TEID to the unicast TEID; sending the last packet of the service for the wireless device in the MBS session to the base station of the RAN; and sending packets of the service to the wireless device via the unicast TEID in response to sending the last packet of the service for the wireless device in the MBS session to the base station of the RAN.

Example 20. The method of any of examples 17-19, in which the computing device of the core network is a User Plane Function (UPF) computing device of a fifth generation (5G) core network and the other computing device of the core network is a Session Management Function (SMF) computing device of the 5G core network.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a wireless device for supporting a multicast/broadcast service (MBS) session, comprising:
receiving an MBS session context via a source base station of a radio access network (RAN), the MBS session context indicating at least one multicast flow identifier (ID) for an MBS session and at least one unicast Quality of Service (QoS) flow ID for a unicast Packet Data Unit (PDU) session, wherein the at least one unicast QoS flow ID is associated with the at least one multicast flow ID;
establishing radio resources using the MBS session context to receive packets of a service from the source base station of the RAN via the MBS session; and
receiving a handover command message from the source base station of the RAN including a PDU session context indicating at least one data radio bearer (DRB) and the at least one unicast QoS flow ID for use in the PDU session with a target base station.

2. The method of claim 1, wherein the source base station of the RAN is a source base station of a fifth generation (5G) RAN.

3. The method of claim 1, further comprising
establishing one or more radio resources of the wireless device according to the PDU session context, the at least one DRB, and the at least one unicast QoS flow ID to receive packets of the service in the PDU session from the target base station; and
moving the MBS session to dormant on the wireless device in response to establishing the one or more radio resources of the wireless device according to the PDU session context and the at least unicast QoS flow ID.

4. The method of claim 3, wherein the target base station is a base station of an Evolved Universal Terrestrial Radio Access Network (E-UTRAN).

5. The method of claim 1, wherein receiving the MBS session context via the source base station of the RAN occurs after the PDU session for the at least one unicast QoS flow ID has already been established by one or more radio resources of the wireless device to receive packets of the service.

6. A method performed by a processor of a base station of a radio access network (RAN) for supporting a multicast/broadcast service (MBS) session, comprising:
receiving an MBS session context from a computing device of a core network, the MBS session context indicating at least one multicast flow identifier (ID) for an MBS session and at least one unicast Quality of Service (QoS) flow ID for a unicast Packet Data Unit (PDU) session, wherein the MBS session context associates the at least one unicast QoS flow ID with the at least one multicast flow ID;
sending the MBS session context to a wireless device camped on the base station of the RAN; and
sending a handover command message to the wireless device camped on the base station of the RAN including a PDU session context indicating at least one data radio bearer (DRB) and the at least one unicast QoS flow ID for use in the PDU session with a target base station.

7. The method of claim 6, further comprising, prior to sending the handover command message:
sending a handover request message to the target base station in response to determining that a mobility event associated with the wireless device camped on the base station of the RAN is occurring, the handover request message indicating the at least one (DRB and the at least unicast QoS flow ID for use in the PDU session and bearer and session information for the MBS session.

8. The method of claim 7, further comprising:
determining whether a handover request acknowledgment message received from the target base station includes an indication of support for the MBS session,
wherein sending the handover command message to the wireless device camped on the base station of the RAN comprises sending the handover command message to the wireless device camped on the base station of the RAN in response to determining that the handover request acknowledgment message from the target base station does not include an indication of support for the MBS session.

9. The method of claim 8, further comprising:
receiving a multicast/broadcast (MB) end marker from the computing device of the core network;
sending the MB end marker to the target base station of the RAN; and stopping forwarding of data from the MBS session to the target base station of the RAN in response to sending the MB end marker to the target base station of the RAN.

10. The method of claim 6,
wherein the target base station is a base station of an Evolved Universal Terrestrial Radio Access Network (E-UTRAN).

11. The method of claim 6, wherein sending the MBS session context to the wireless device camped on the base station of the RAN occurs after a PDU session for the at least one unicast QoS flow ID has already been established with the wireless device camped on the base station of the RAN.

12. The method of claim 6, wherein the computing device of the core network is a User Plane Function (UPF) computing device of a fifth generation (5G) core network.

13. A wireless device, comprising:
a processor configured with processor-executable instructions to:
receive a multicast/broadcast service (MBS) session context via a source base station of a radio access network (RAN), the MBS session context indicating at least one multicast flow identifier (ID) for an MBS session and at least one unicast Quality of Service (QoS) flow ID for a unicast Packet Data Unit (PDU) session, wherein the at least one unicast QoS flow ID is associated with the at least one multicast flow ID;
establish radio resources using the MBS session context to receive packets of a service from the source base station of the RAN via the MBS session; and
receive a handover command message from the source base station of the RAN including a PDU session context indicating at least one data radio bearer (DRB) and the at least one unicast QoS flow ID for use in the PDU session with a target base station.

14. The wireless device of claim 13, wherein the processor is further configured with processor-executable instructions to
establish one or more radio resources of the wireless device according to the PDU session context, the at least one DRB, and the at least one unicast QoS flow ID to receive packets of the service in the PDU session from the target base station; and
move the MBS session to dormant on the wireless device in response to establishing the one or more radio resources of the wireless device according to the PDU session context and the at least unicast QoS flow ID.

15. The wireless device of claim 13, wherein:
the processor is configured with processor-executable instructions such that receiving the MBS session context via the source base station of the RAN occurs after the PDU session for the at least one unicast QoS flow ID has already been established by one or more radio resources of the wireless device to receive packets of the service.

16. A wireless device, comprising:
means for receiving a multicast/broadcast service (MBS) session context from a source base station of a radio access network (RAN), the MBS session context indicating at least one multicast flow identifier (ID) for an MBS session and at least one unicast Quality of Service (QoS) flow ID for a unicast Packet Data Unit (PDU) session, wherein the at least one unicast QoS flow ID is associated with the at least one multicast flow ID;
means for establishing radio resources using the MBS session context to receive packets of a service from the source base station of the RAN via the MBS session; and
means for receiving a handover command message from the source base station of the RAN including a PDU session context indicating at least one data radio bearer (DRB) and the at least one unicast QoS flow ID for use in the PDU session with a target base station.

17. The wireless device of claim 16, further comprising
means for establishing one or more radio resources of the wireless device according to the PDU session context, the at least one DRB, and the at least one unicast QoS flow ID to receive packets of the service in the PDU session from the target base station; and
means for moving the MBS session to dormant on the wireless device in response to establishing the one or more radio resources of the wireless device according to the PDU session context and the at least unicast QoS flow ID.

18. The wireless device of claim 16, wherein receiving the MBS session context via the source base station of the RAN occurs after the PDU session for the at least one unicast QoS flow ID has already been established by one or more radio resources of the wireless device to receive packets of the service.

* * * * *